Jan. 31, 1939.　　　J. P. STOCKTON　　　2,145,498
PHONOGRAPH
Filed March 16, 1928　　11 Sheets-Sheet 1
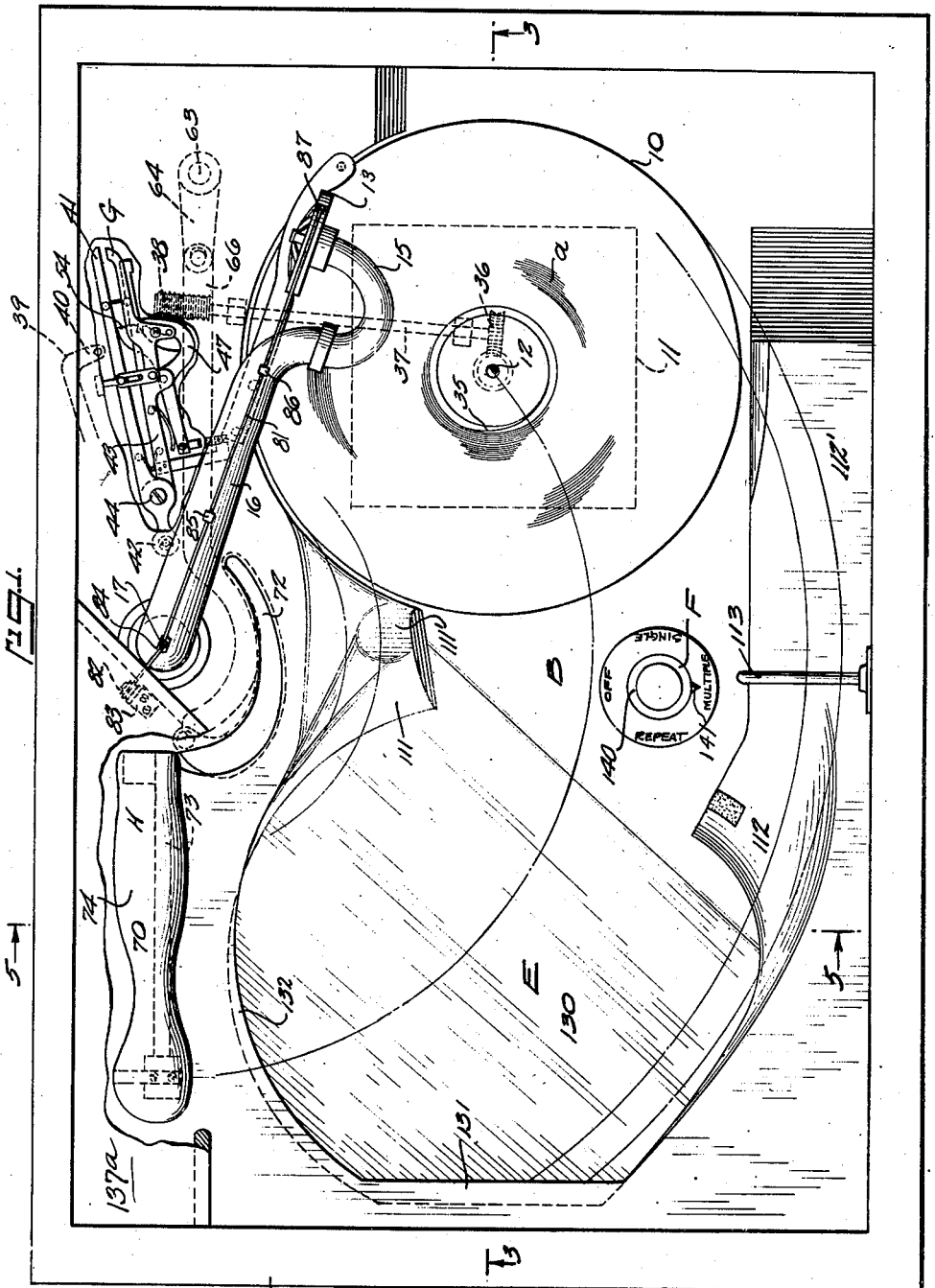
INVENTOR
Jack Potter Stockton
BY
his ATTORNEY

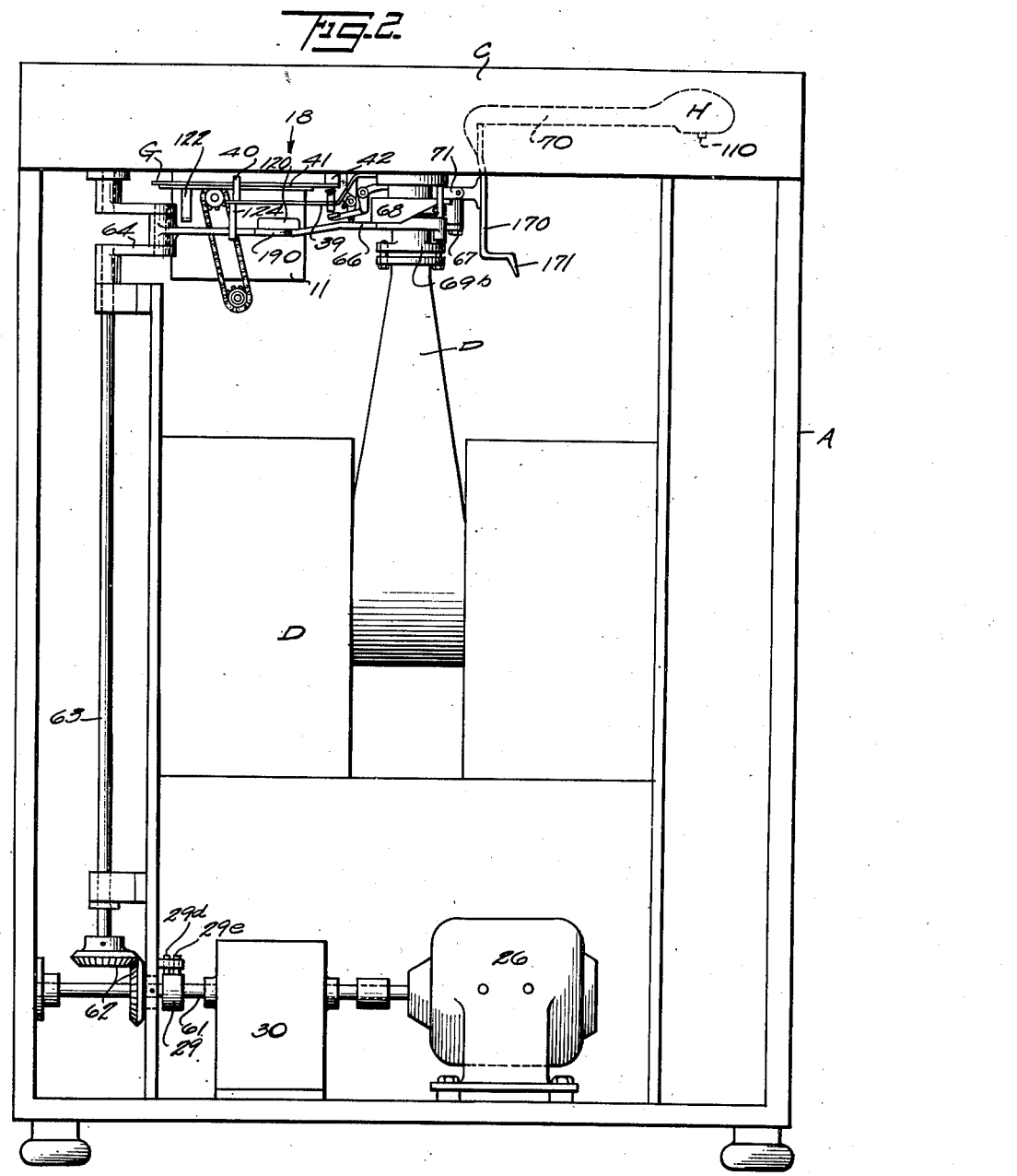

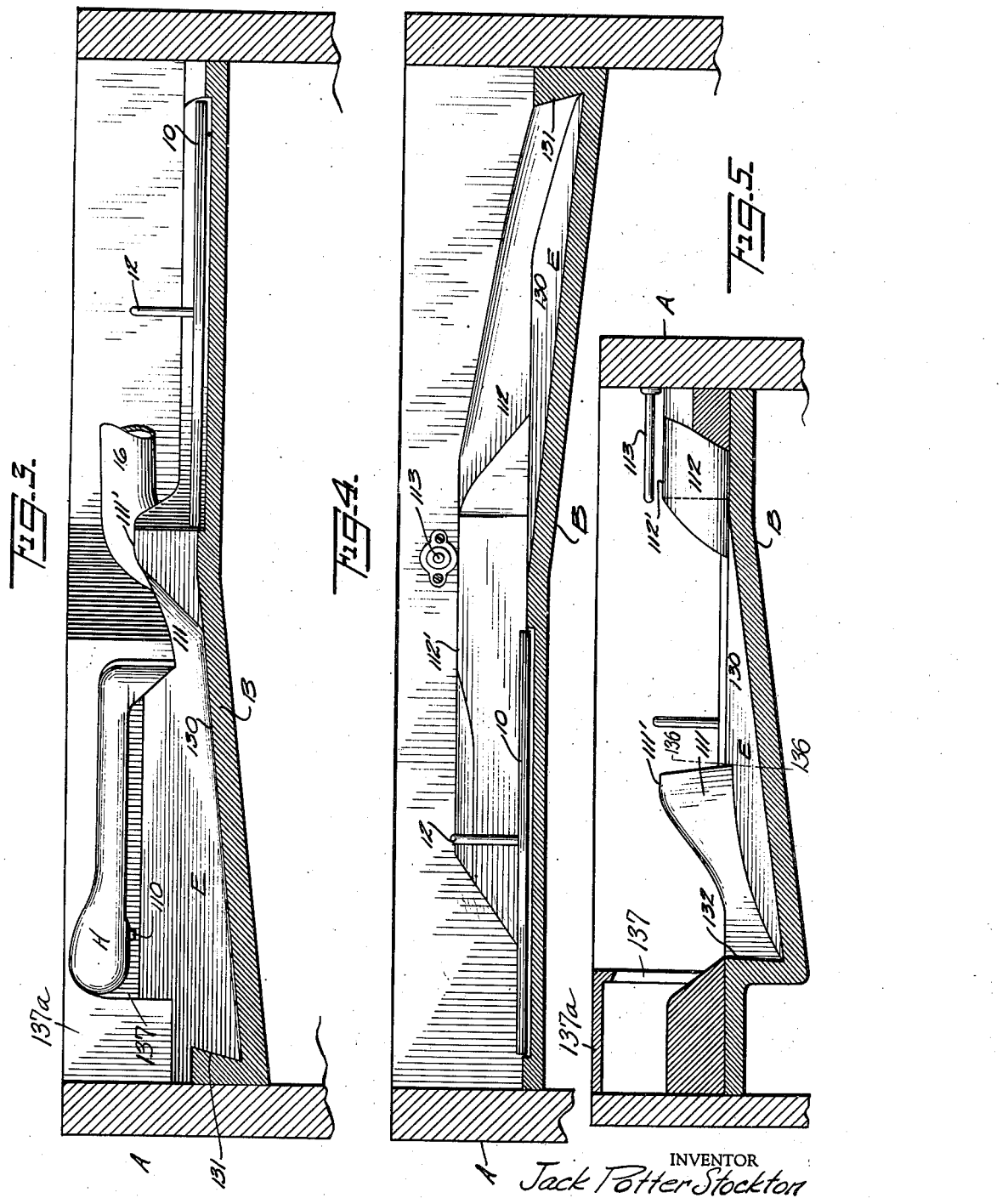

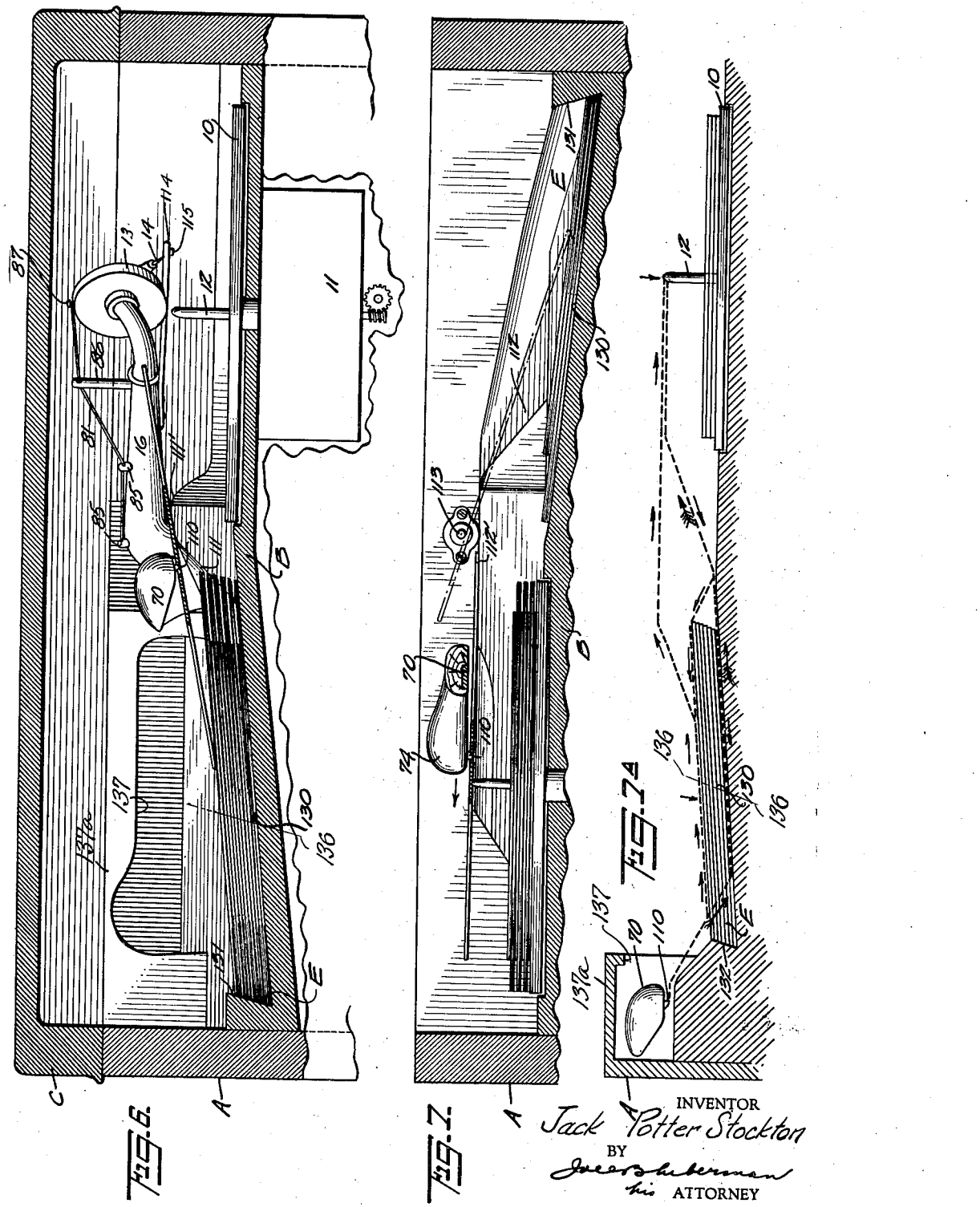

Jan. 31, 1939. J. P. STOCKTON 2,145,498
PHONOGRAPH
Filed March 16, 1928 11 Sheets-Sheet 5
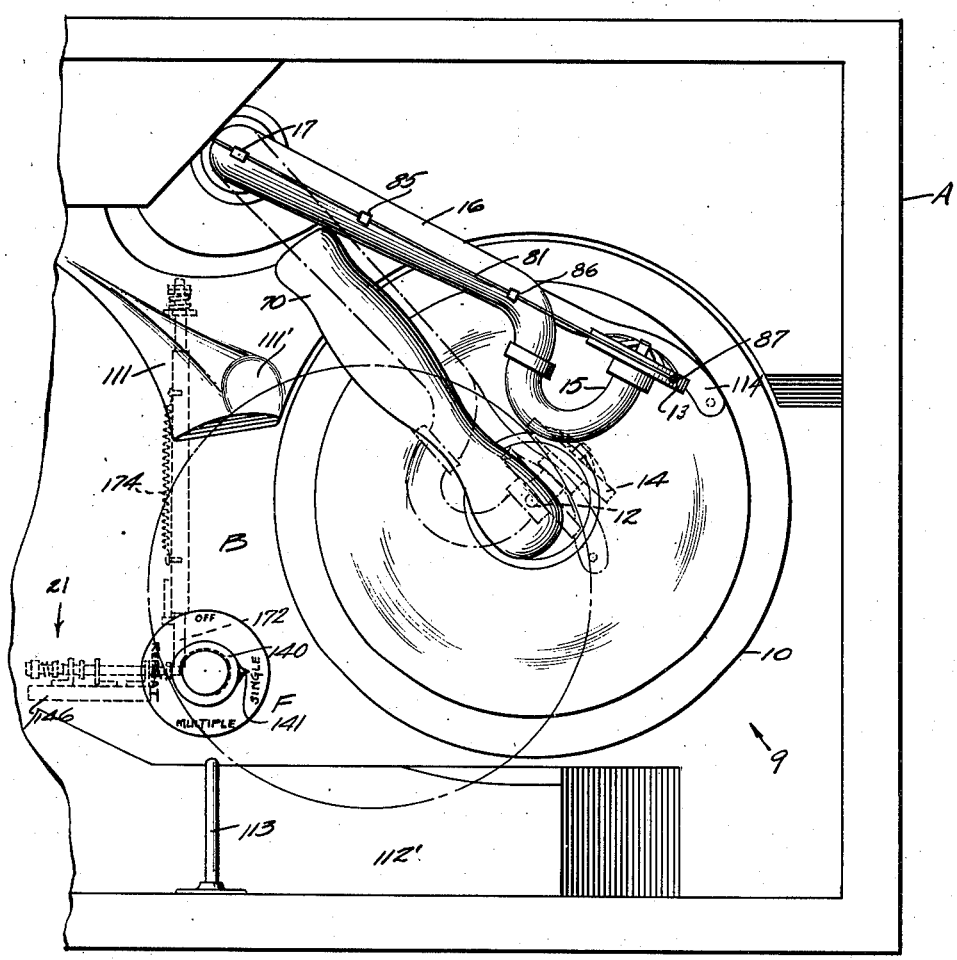
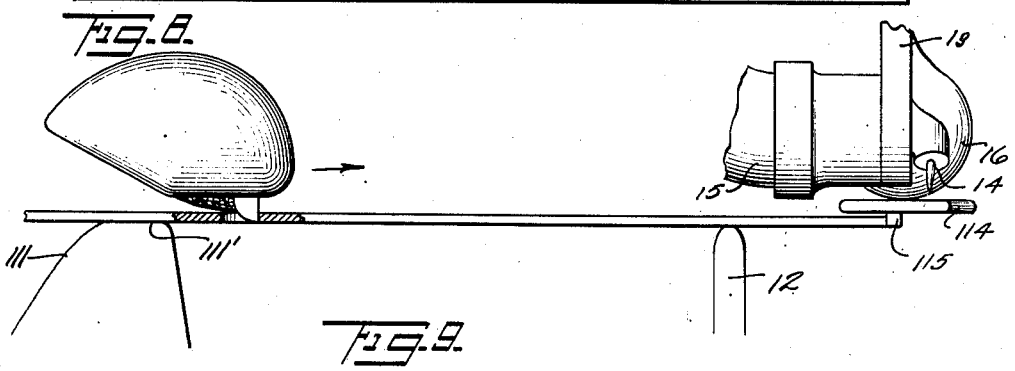
INVENTOR
Jack Potter Stockton
BY
ATTORNEY

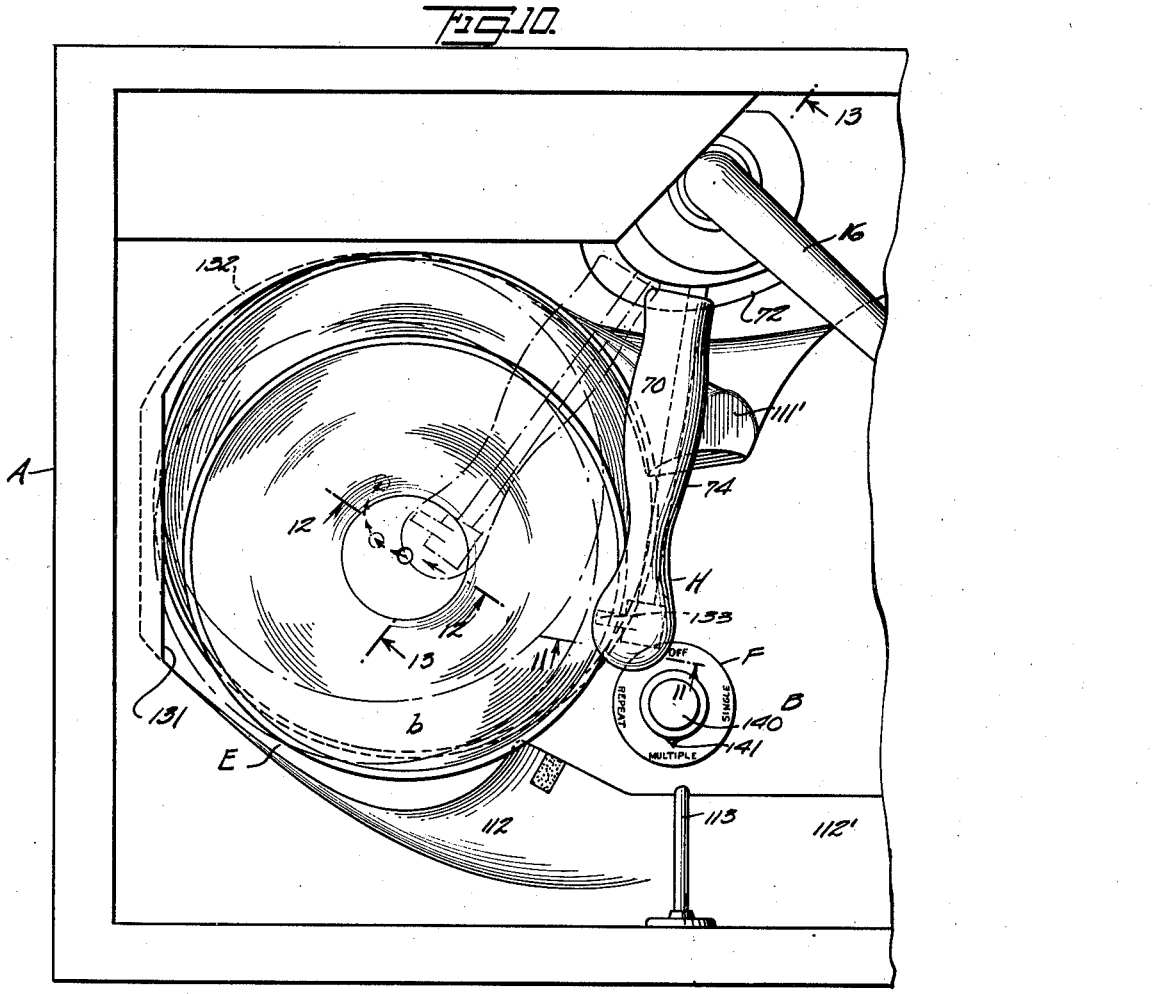
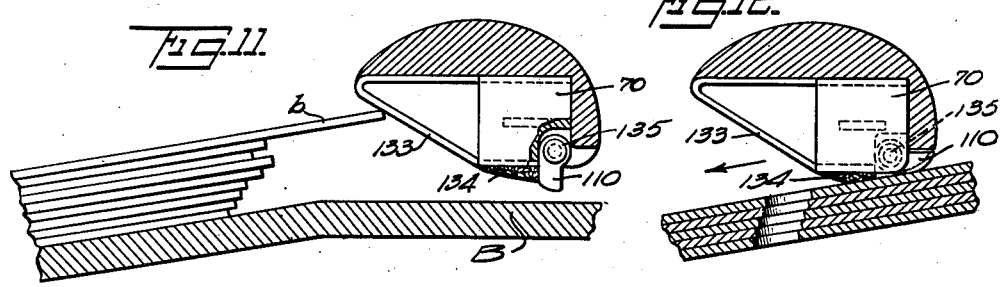
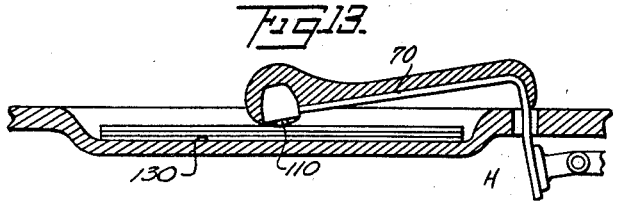

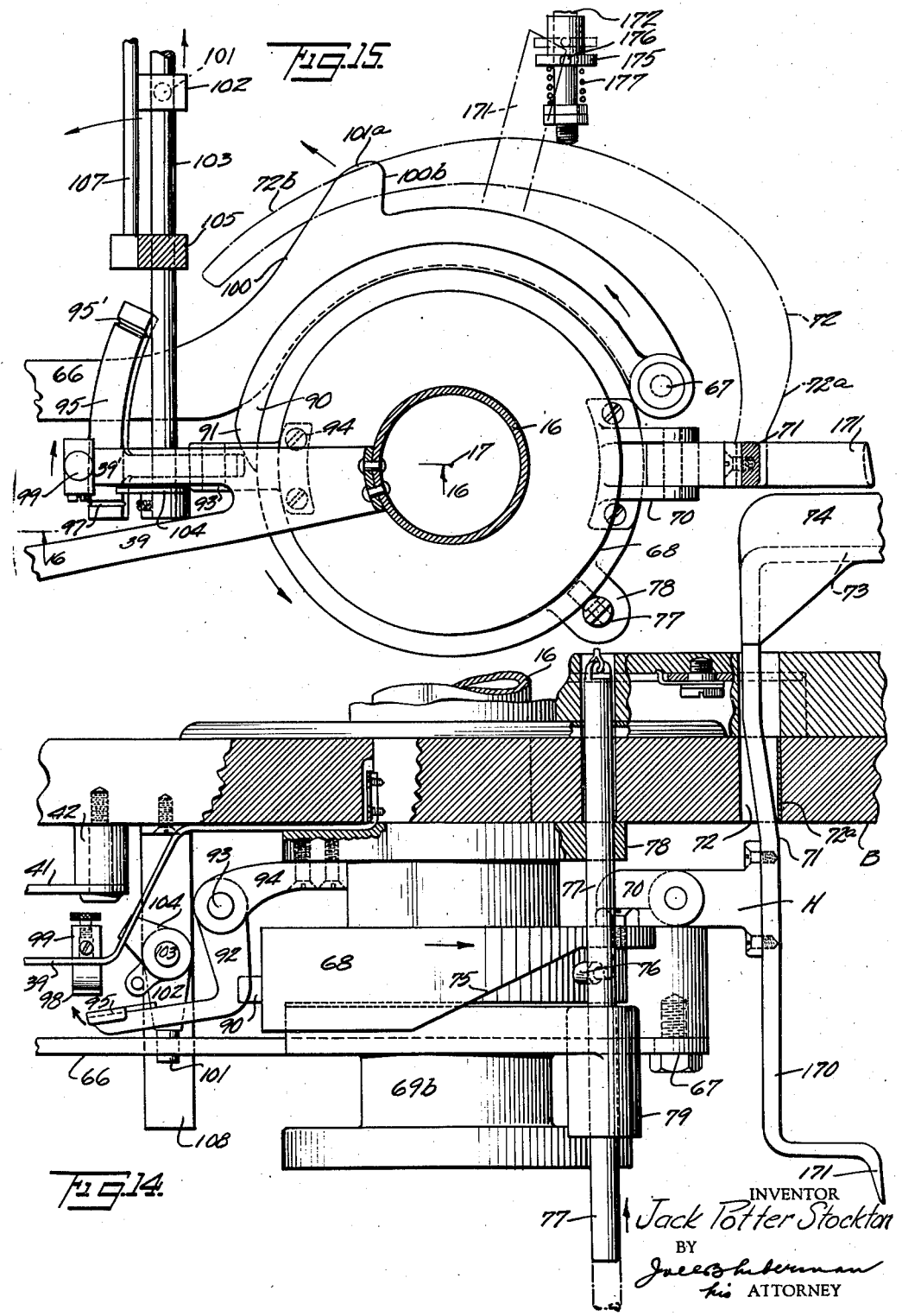

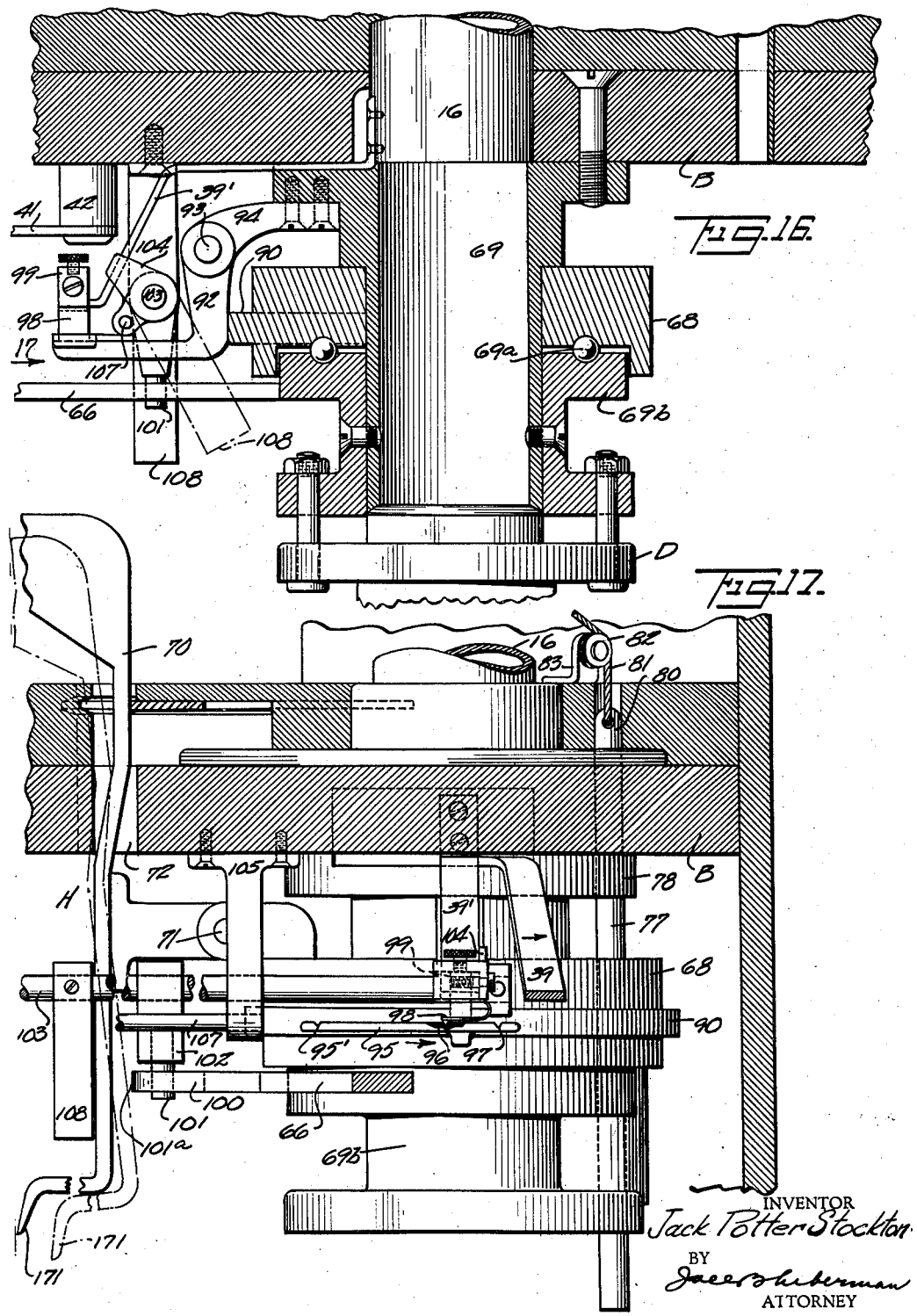

Jan. 31, 1939.  J. P. STOCKTON  2,145,498
PHONOGRAPH
Filed March 16, 1928  11 Sheets-Sheet 9
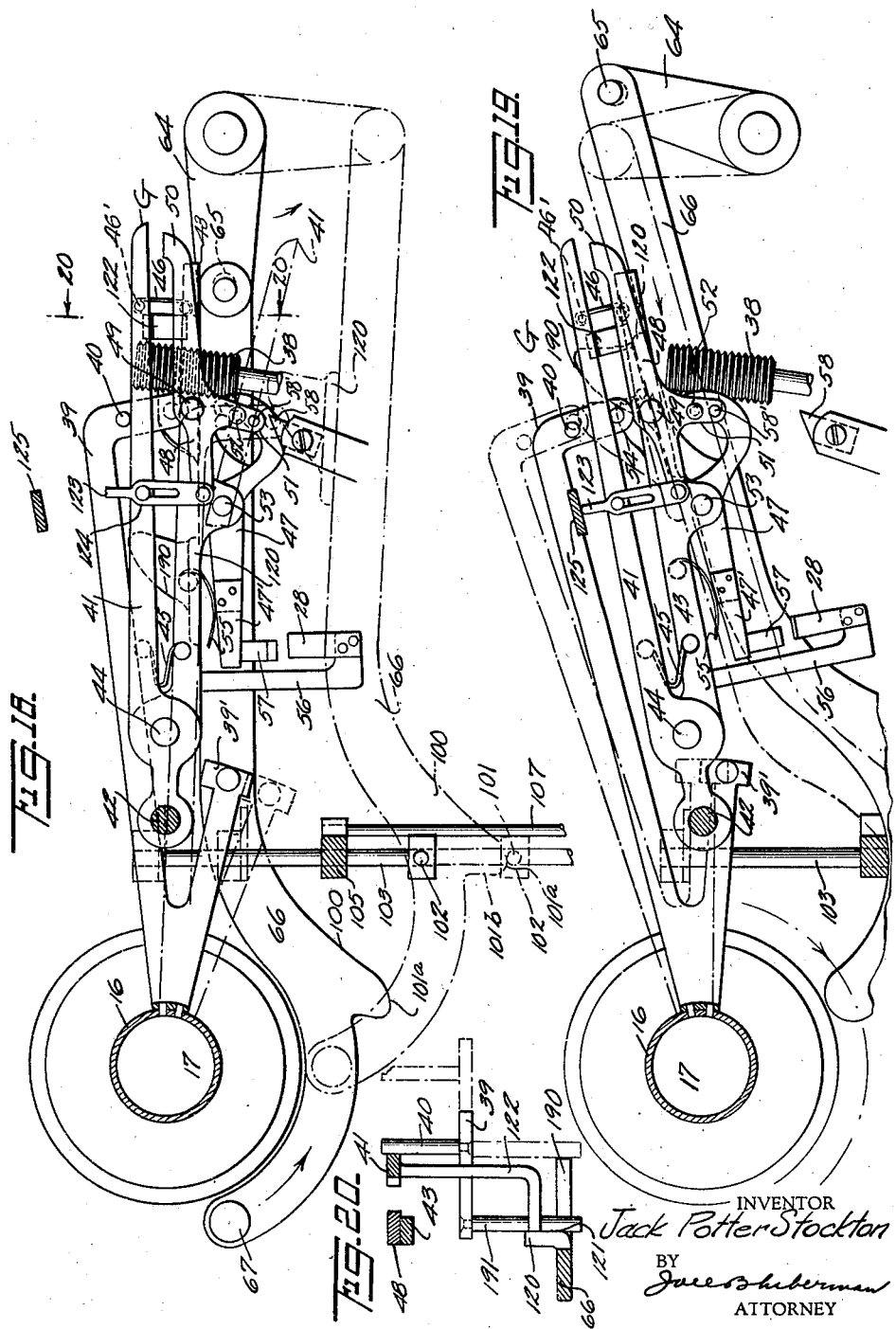
INVENTOR
Jack Potter Stockton
BY
Jules Shuberman
ATTORNEY

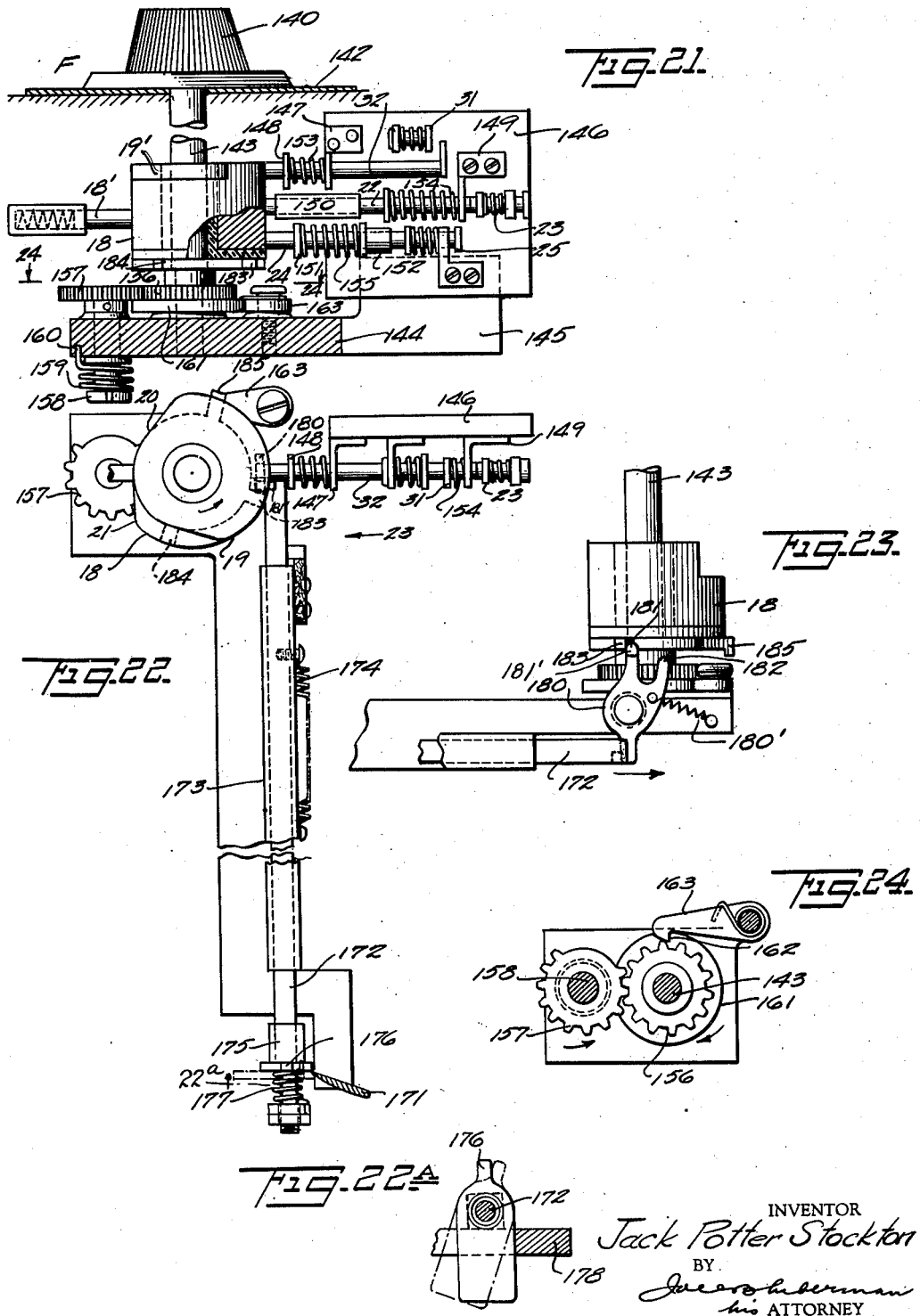

Jan. 31, 1939.  J. P. STOCKTON  2,145,498
PHONOGRAPH
Filed March 16, 1928  11 Sheets-Sheet 11

INVENTOR
Jack Potter Stockton
BY
ATTORNEY

Patented Jan. 31, 1939

2,145,498

UNITED STATES PATENT OFFICE 2,145,498

PHONOGRAPH

Jack Potter Stockton, Spring Lake, N. J., assignor to Stromberg-Carlson Telephone Manufacturing Company, a corporation of New York Application March 16, 1928, Serial No. 262,190

155 Claims. (Cl. 274—10)

The present invention relates to phonographs and is more particularly directed toward an automatic multiple record phonograph wherein a series of records may be played on a rotating record support, the succeeding record being automatically deposited on top of a record which has already been played, all the mechanism for accomplishing this shifting of the record being automatically set into operation upon the completion of the playing of said record. In this manner the records are brought onto the rotating record support and stacked on it one above the other.

Automatic multiple record phonographs heretofore available have generally required that the records to be played be placed in a record storage device or magazine of complicated construction, and have also required a complicated mechanism for operating on the same to shift the record to a predetermined preset position before it could be moved from the magazine or storage mechanism onto the rotating platform. Such mechanisms were likely to get out of order, were expensive to make and finish, and required considerable power for their operation. As the records must be accurately placed in these devices, considerable care must be exercised, and in some cases, special tools are advised. Owing to the complicated nature of the record storage mechanisms employed, it has been impossible to reduce the minimum time interval between records to the desired amount, especially for playing dance music when the records should follow one another very closely. Furthermore, these mechanisms have not been of such a nature that they could be incorporated into cabinets of the conventional type having a cover, a substantially flat phonograph table over which the tone arm swings, and an enclosed amplifying horn and record storage compartments underneath the table. Special cabinets of larger dimension and greater expense have been found necessary to enclose the phonograph provided with the automatic record change mechanism.

The present invention contemplates an automatic multiple record phonograph designed so that it can be incorporated into cabinets of the conventional type and of substantially the same size as those now ordinarily used in high class non-automatic instruments playing a single record.

The invention also contemplates an automatic multiple record phonograph wherein substantially all the operating parts are carried underneath the phonograph table so that these parts are invisible above the phonograph table. The few parts which are to be seen above the phonograph table are unobtrusive and so arranged as to present a pleasing appearance.

The former types of record changing phonographs have been able to play a series of ten inch records or a series of twelve inch records by properly presetting the parts for the series to be played, but so far as I am aware, it has been impossible with any device heretofore available to play either ten inch or twelve inch records in whatever order they happen to be placed in the record storage magazine. According to the present invention, however, the machine works entirely automatically so that the transferring of a records onto the playing platform automatically places the parts into position to play a record of that size. This resetting operation according to record size, is carried out for each record so that one is at liberty to use either size of records or any arrangement of records of both sizes.

Furthermore, the invention contemplates an automatic record changing phonograph provided with a record storage device and record handling mechanism so arranged that careful placing of the records in the storage device is unnecessary for the satisfactory operation of the phonograph. The present invention contemplates the placing directly on the platform of the first record to be played, and the placing of the remaining records of the desired repertoire or selection of records in the storage device or magazine. The deposit of these records is made without care being taken to bring them to definite positions relative to one another except that the upper record is slid over the stack to a predetermined position. The remaining records in the stack are in indeterminate relation, merely resting on those underneath. After the upper record has been transferred to the playing platform, the record to be played next is automatically shifted to the desired position where it remains until the mechanism functions to shift it to the rotating record support.

The invention also contemplates the employment of an auxiliary motor and control therefor whereby the motor is started as soon as the stylus on the reproducer passes from the record grooves into a higher pitched groove inside the playing area of the record. A motor running switch is then closed after which the starting switch is reset to open position. As soon as the auxiliary motor has moved the record shifting mechanism and other phonograph controls through the complete cycle of movement, the running switch is opened.

According to the preferred wiring arrangement suitable circuits and switches are provided for controlling the motors so that anyone of the following operations may be obtained:

I. Play a single record once after which the auxiliary motor goes through a complete cycle of operations (without shifting a record) whereupon the auxiliary motor and turn table motor are stopped after the completion of the cycle.

II. Play records automatically in succession as long as there are records in the magazine to be played, whereupon, after the last record has been played once, the circuit arrangement is shifted for operation I, playing this last record, however, from the 10 inch position.

III. Repeat a record placed on the platform, or the last record of a repertoire of records, until the phonograph is stopped manually.

A further object of the invention is to provide an automatic phonograph in which mechanism is provided for shifting the record to be played from the storage magazine to the playing platform, this mechanism engaging with the central hole in the record to shift it over stationary guides into the position in which it may drop onto the turn table pin.

The invention also contemplates the design of an automatic multiple record phonograph wherein the parts are so arranged that the cabinet design and arrangement of acoustic devices may be unchanged.

A further object of the invention is to provide an automatic phonograph with a record storage magazine adjacent the playing platform and associated with stationary guides over which a record may be moved by a pin engaging the central hole of the record to bring the record over the center pin on the turn table.

Other and further objects of the invention will appear as the description proceeds. It is understood that the reference to ten inch and twelve inch records is merely a convenient method of referring to the two most popular sizes of large records. The invention may be structurally embodied in constructions suitable for other record sizes, if desired. While for purposes of illustrating the invention the present drawings show it embodied in a sound producing machine employing a swinging tone arm to carry the sound waves away from the reproducer, and the structural organization of the parts for handling the record is built up about the center of the tone arm support, it is to be understood that many features of the invention may equally well be employed in a sound reproducing machine wherein one is not restricted to the use of a tone arm or to any particular form of movable reproducer support.

The accompanying drawings show, for purposes of illustrating the present invention, one of the many possible embodiments in which the invention may take form, it being understood that the drawings are illustrative of the invention rather than limiting the same.

In these drawings:

Figure 1 is a top plan view of the table of an automatic phonograph with the record shifting mechanism in the position to which it is brought after it has completed an operation, and with the tone arm and associated parts in the position to begin to play a twelve inch record, parts being broken away to show the record shifting arm at the left and the automatic control switch at the right;

Figure 2 is a rear elevational view of the phonograph cabinet illustrating an arrangement of auxiliary motor and driving connections for the record shifting arm;

Figure 3 is a sectional view through the phonograph table taken on the line 3—3 of Figure 1 and looking in the direction of the arrow, showing a part of the record magazine and one of the record guides;

Figure 4 is a view also taken on the line 3—3 of Figure 1, but looking in the opposite direction;

Figure 5 is a sectional view through the phonograph table on the line 5—5 looking in the direction of the arrow and showing the record magazine and both record guides;

Figure 6 is a sectional view taken on the line 3—3 of Figure 1 looking in the direction of the arrows, the stack of records being shown in the storage area of the record magazine, and one record being shown as partly shifted from the storage area to the playing platform;

Figure 7 is a view taken in the same direction as Figure 4 and showing the path of records being shifted from the storage area to the playing platform, the position of the record being somewhat further advanced in Figure 7 than in Figure 6;

Figure 7a is a diagrammatic view illustrating the vertical movement of the free end of the record shifting arm when transferring a record, and also in the absence of a record to be transferred.

Figure 25:
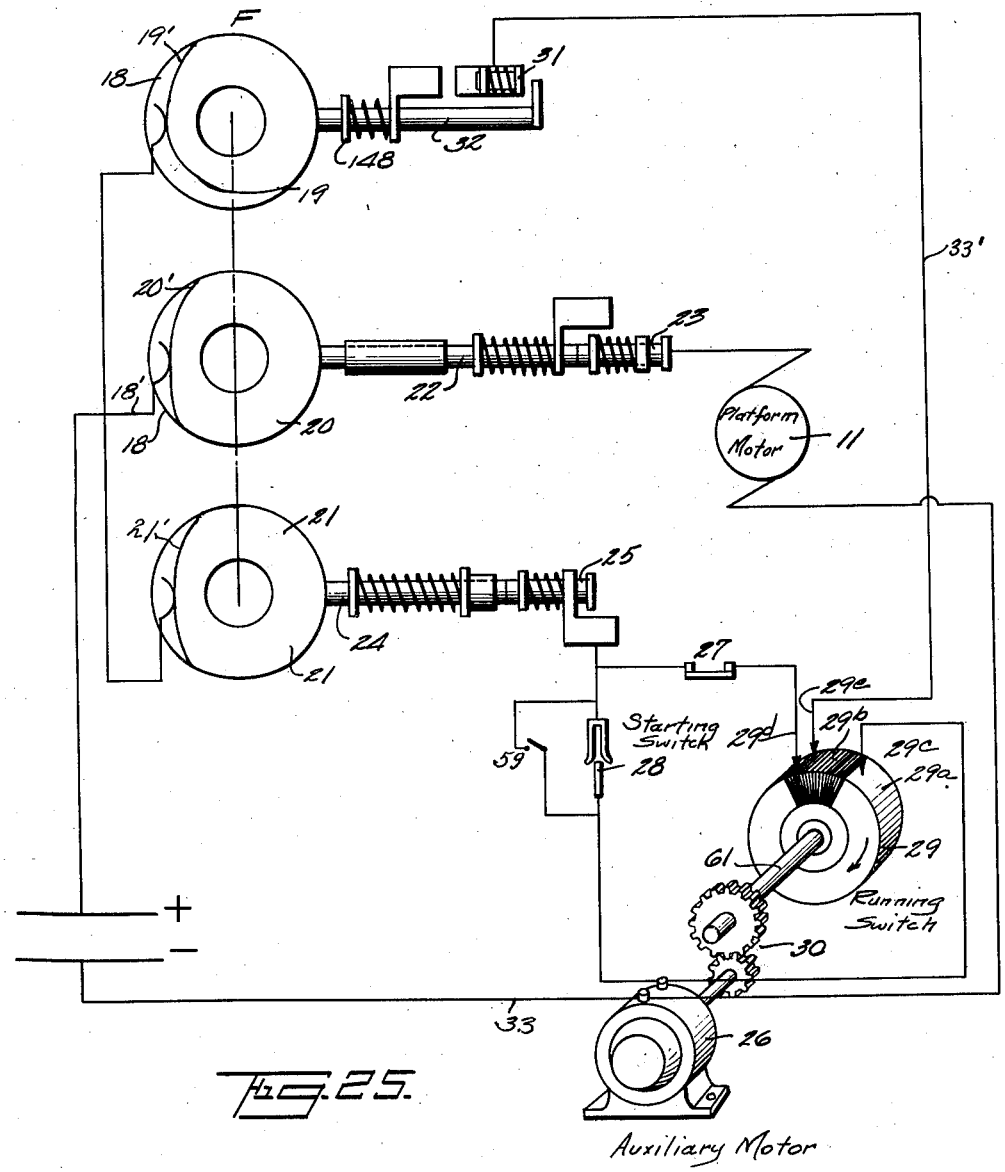

Figure 8 is a top plan view of the right hand side of the phonograph (as viewed in Figure 1), showing in full lines the record shifting arm in its extreme position where it would deposit a record on the playing platform, the tone arm having been shifted by the record shifting arm to substantially the position to begin playing a ten inch record, the tone arm being shown in dot and dash lines in the position to which it is brought by the record changing mechanism after a record has been completed, and showing the reproducer in dotted lines in the position at the end of playing a record;

Figure 9 is a fragmentary view taken in the direction of the arrow 9 of Figure 8 and illustrating the bringing of the edge of a record being transferred into engagement with the swinging reproducer support, and the supports for this record;

Figure 10 is a top plan view of the left or record magazine end of the phonograph table (as viewed in Figure 1), showing more particularly a stack of records arranged in indeterminate relation thereon and the operation of automatically arranging the upper record in a predetermined position;

Figure 11 is a sectional view taken in the direction of the arrows 11 of Figure 10 and illustrating the action of the record shifting arm in bringing this record to the desired position in the record magazine;

Figure 12 is a sectional view taken in the direction of the arrow 12 of Figure 10 showing a further step in the operation of locating the record and the offsetting of the record center holes;

Figure 13 is a diagrammatic sectional view on the line 13—13 of Figure 10 illustrating the relation of the record shifting arm to the stack of records;

Figure 14 is an enlarged view taken from the rear of the phonograph cabinet and showing the mechanism carried underneath the table adjacent the pivot of the tone arm and the parts in the playing position;

Figure 15 is a top plan view of the apparatus shown in Figure 14, the phonograph table being omitted;

Figure 16 is a central sectional view on the line 16—16 of Figure 15, the parts having been shifted to the position shown in full lines in Figure 8;

Figure 17 is an elevational view taken in the direction of the arrow 17 of Figure 16 showing the tone arm shifted to the ten inch position;

Figure 18 is a plan view taken in the direction of the arrow 18 of Figure 2 illustrating the automatic record controlled starting switch for the auxiliary motor, and the drive between this motor and the record shifting mechanism, the full lines showing the parts in playing position just prior to the completion of the playing of a record, the dot and dash lines showing the parts in the position assumed after the auxiliary motor has operated the record shifting mechanism to partially move the record from the magazine to the playing platform, and to bring the tone arm inwardly to the dot and dash line position of Figure 8 to meet this record;

Figure 19 is a view similar to Figure 18, parts shown in full lines being in the position assumed when the automatic starting switch has been opened, the dot and dash lines showing the position assumed when the tone arm has been reset to ten inch playing position to play from that position;

Figure 20 is a section taken on the lines 20—20 of Figure 18;

Figure 21 is a side elevational view of the selector switch for controlling the operation of the platform motor and the auxiliary motor, the selector switch being shown in the "multiple" position and taken in the direction of the arrow 21 of Figure 8;

Figure 22 is a top plan view of the selector switch and control mechanism for the same;

Figure 22a is a fragmentary elevational view taken in the direction of the arrow 22 of Figure 22;

Figure 23 is an elevational view taken in the direction of the arrow 23 of Figure 22, parts being omitted;

Figure 24 is a sectional view taken on the line 24—24 of Figure 21; and

Figure 25 is a wiring diagram, showing the selector switch in the "multiple" position for playing a plurality of records in succession.

As above indicated, the present form of automatic phonograph is capable of conveniently being embodied in a phonograph cabinet of conventional style and for purposes of illustrating the invention, it is so shown in the drawings. It will of course be understood that many features of the invention may be applied in apparatus in which the sound waves are picked up by an electric reproducer and amplified electrically instead of mechanically.

The form of phonograph cabinet chosen for illustrating the invention is designated by the reference character A. It has a table B which extends across the upper part of the cabinet A spaced below the upper edges of the cabinet body in the ordinary position in which phonograph tables are placed in such cabinets. The top of the cabinet is closed by a cover C in the usual manner. The stationary sound amplifying apparatus, designated generally by the reference character D, is built into the cabinet underneath the phonograph table in the usual manner.

Instead of placing the rotating playing platform 10 in the center of the phonograph table as is customary in non-automatic phonographs, this table is, as indicated in Figure 1 of the drawings, placed to the right of the center. It is operated by the usual platform motor indicated at 11 and is adapted to receive a stack of records held in place by a centering pin 12. The reproducer and stylus for cooperation with the records on the playing platform are indicated at 13 and 14, respectively. They are carried on the usual goose neck 15 supported on the usual swinging tone arm 16 pivoted about a vertical axis 17. Where the invention is to be employed with an electric pick up device instead of a tone arm, the reproducer for the electric pick up may be carried on a movable reproducer support.

As indicated in the drawings, the center, pivot, or axis, about which the tone arm swings is placed in the center of the cabinet near the rear in the same position in which it is ordinarily located in phonographs wherein the playing platform is in the middle of the cabinet. The location of the playing platform on the right hand side of the cabinet provides room at the left for a record magazine or storage area designated generally by the reference character E and into which it is possible to place a repertoire of records which are to be played off in succession. In placing this stack of records in this record magazine, it is not necessary to accurately locate each and everyone of the records in the stack. The uppermost record of this selection is, however, preferably shifted as far toward the left rear corner of the cabinet as is possible.

For purposes of describing the operation of the phonograph, it will be assumed that the first record of the selection is a twelve inch record and has been placed on the playing platform as indicated at a in Figure 1, that the upper record in the magazine is pushed back as far as possible, and that the remaining records in the record magazine have been placed therein in indeterminate relation, as indicated in Figure 10.

The operation of the phonograph is under the control of a selector switch F capable of being manually preset to various positions conveniently designated as "single", "multiple" "repeat" and "off". This selector switch controls the flow of current to both the platform motor and the auxiliary motor. It is indicated diagrammatically in the wiring diagram in Figure 25 and shown in detail in Figures 21 to 24, inclusive.

The selector switch is associated with suitable operating mechanism whereby it may be manually preset in any of the desired positions to carry out the various cycles of operation above mentioned. It is capable of automatically shifting from the "multiple" position to the "single" position and from the "single" position to the "off" position when it is preset in those positions and the record shifting mechanism thereafter operates in the absence of a record to be shifted.

The selector switch F carries an insulatively supported metallic ring 18 having three camming sections indicated in Figure 25 at 19, 20 and 21, respectively. This metal ring is connected to one side of the power source through a brush 18'. The cam 19 is cut away to about one-half of the circumference as indicated at 19', while the cams 20 and 21 are cut away about one-quarter of the circumference, as indicated at 20' and 21'. Each of these cam portions of the ring are cooperative with followers so as to control circuits leading away from the ring. The cam 20 is associated with a follower 22 cooperative with a stationary contact 23 and adapted, when closed as indicated in Figure 25, to supply current to the platform motor 11. The follower 24 on the cam 21 is cooperative with a stationary contact 25 to connect into the circuit of the auxiliary motor 26.

In the drawings, various switches are shown as being interposed in the circuit for the auxiliary motor. One of these switches indicated at 27 is a switch provided for the purpose of controlling the intermission between the playing of various records. It may be omitted if desired. The motor starting switch 28 is normally open and under the control of the swinging reproducer support. It is adapted to be closed after the completion of the playing of a record and to be thereafter reset to open position prior to the completion of the operation of the record shifting mechanism, and is in parallel with a normally open rotary or running switch 29.

The motor starting switch 28 may be any convenient form of switch which may be closed after the completion of the playing of a record. Such switch is designated generally by the letter "G". In order that the phonograph may be capable of playing the records made by various manufacturers I prefer to employ an automatic switch such as described and claimed in my Patent No. 1,715,873, granted June 4, 1929, for Automatic controls for phonographs. This form of switch is one which acts in repsonse to the sudden inward movement of the reproducer occasioned after the stylus moves from the low pitched groove in the playing surface toward a control groove placed inside the playing surface. This sudden inward movement of the reproducer is utilized to initiate the operation of the record changing mechanism. This motor starting switch is capable of being reset during the cycle of operations.

The rotary switch 29 is driven from the auxiliary motor 26 through a gear box diagrammatically indicated at 30. It has a metal contact 29a extending nearly through the circumference and interrupted by an insulating segment 29b. A brush 29c connected to one terminal of the auxiliary motor is adapted to ride on the metal segment 29a. A brush 29d is connected to the time or intermission switch 27 and a brush 29e is connected by a lead 33' to a yielding contact 31 cooperative with the plunger 32 which is associated with the cam 19 on the ring of the selector switch. The platform motor 11 and auxiliary motor 26 are connected to the other side of the line through a lead indicated at 33.

Assuming that the twelve inch record is on the platform and that the stylus has been placed in the record groove, and the switch F turned to the "multiple" position, as shown in Figure 25, the cycle of operations will be described in detail. The stylus will follow along in the grooves in the record on this platform playing this record in the usual manner and carrying the reproducer and associated parts from the full line position of Figure 1 to the dotted line position shown in Figure 8, during which time the record plays as usual. The stylus enters into the special control groove indicated at 35, herein shown as a concentrically located groove commonly used by many record manufacturers. It, however, makes no difference in the operation of the device whether the concentric form of groove is used or an eccentric form of groove, for in either case there is a sudden inward movement of the swinging reproducer support occurring after the completion of the playing of the record.

While the contacts 28 of the switch G are in the auxiliary motor circuit, this switch is under the combined control of the swinging reproducer support 16 and the platform motor 11. The platform motor through a suitable speed reducing train 36 drives a shaft 37 carrying a worm 38 which is adapted to revolve at a speed proportional to the speed of the playing platform. The inner end of the reproducer support or tone arm 16 is fixedly connected with a swinging member or arm 39 adapted to swing underneath the table. This tone arm actuated member 39 is, as shown in Figures 2 and 18 to 20, inclusive, provided with an upwardly extending pin 40 engageable with a long thin flat arm 41 pivotally mounted at 42 underneath the phonograph table.

At the beginning of the playing of the record the pin 40 is spaced a considerable distance from the swinging member 41 as indicated in Figure 1 and in dot and dash lines as indicated in Figure 20, but is brought into engagement with this swinging arm 41 during the latter part of the playing of the record. The free end of the swinging arm 41 may be supported by a guide if desired. This swinging arm 41 carries a second movable member in the form of a long thin flat arm 43 pivoted at 44. An expansion spring 45 is interposed between these arms to hold them separated as shown in the full line position of Figure 18. The distance that these arms can separate, however, is limited by means of a cross strap 46 fastened to the arm 43 and hooked over a pin 43' carried by the arm 41. This arrangement of parts permits the arms 41 and 43 to swing bodily as a unit about the pivot 42 as soon as the pin 40, operating with the tone arm, is brought against the arm 41 and at a speed proportional to the feed of the stylus. There is, however, nothing to prevent moving the arm 41 toward the arm 43 when that arm is held stationary or compelled to move at a rate slower than the movement produced by the advance of the tone arm.

In order that the arm 43 of the automatic switch mechanism may be moved at a speed corresponding to the rate of advance of the arm 41 as determined by the inward feeding of the tone arm, means is provided by which arm 43 may be driven at the proper time by the worm 38 actuated by the platform motor. The arm 43 pivotally supports two members 47 and 48 cooperatively associated for the purposes above referred to. The member 48 acts as a trigger or detent and is pivoted on the arm 43 at 49. The member 48 carries a long arm 50 which is adjacent the outer end of the arm 41 and also is provided with a short arm 51 carrying a downwardly extending pin 52 to cooperate with a notch in the adjacent end of the member 47. This member 47 is pivoted at 53 and besides being provided with a notched end to cooperate with the pin 52, it also carries a downwardly extending serrated portion 54 adapted to cooperate with the worm 38 driven at constant speed by the platform motor. In order to hold the pin 52 in the notch, a spring 55 is provided between the member 43 and the member 47 pivoted thereon. The arm 43 is provided with a laterally extending contact carrier 56 conveniently made in the form of a strip of insulating material and provided with one of the contacts of the starting switch 28 for the auxiliary motor 26. The arm 47 has an insulated tip 47' which supports a conducting bridging member 57 cooperative with the contacts carried by the arm 56 for opening and closing the circuit through starting switch 28.

When the phonograph has operated long enough to bring the tone arm in near the end of the record, the pin 40 will have bodily moved the arms 41 and 43 in far enough to bring the serrated edge of the downwardly extending portion 54 of the member 47 into engagement with the worm 38. This worm is driven at a speed such that the arm 43 and parts carried thereby will be driven from the worm at the same rate that the arm 41 is driven from the tone arm. These parts are then in the position indicated in full lines in Figure 18.

As soon, however, as the stylus and reproducer pass from the playing surface into the high pitched groove, leading into the concentric or eccentric groove, there will be a sudden inward movement of the tone arm and all parts connected with it. This sudden inward movement of the tone arm will swing the arm 41 in a clockwise direction bringing the free end of this arm against the free end 50 of the lever member 48. The pivot 49 for this lever, however, is held comparatively stationary on account of the interlocking connection with the arm 47 carrying the follower for the worm. The arm 48 will thereupon be moved slightly about the center 49 and will release the pin 52 from the notch in the member 47 thereby permitting the spring 55 to swing the member 47 in a counterclockwise direction releasing the worm feed, bringing the bridging member 57 into engagement with the contacts of the switch 28, thereby closing this switch and starting the auxiliary motor 26 into operation.

The motor starting switch G is also adapted to be tripped by a permanent or fixed stop, here shown in the form of a cam 58 mounted in the path of the pin 58'. This cam is ordinarily inactive, the switch being tripped by the sudden inward movement of the reproducer support. It, however, serves to limit the inward movement of the arms 41 and 43 in certain conditions such as when the record being played does not have a lead in groove inside the playing surface or wherein the stop groove is so close to the playing surface that the inward movement is of too small an amount. In such cases the worm carries the switch members along with it until the pin is brought against the cam 58 to open the switch. Thus the starting switch for the auxiliary motor will be closed even though there is no sudden inward movement after the completion of the playing of a record.

It will also be understood that one can manually close the motor starting switch 28 so as to start the cycle of operations by merely lifting the stylus off the record and swinging the reproducer and stylus inwardly to bring the serrated portion 54 against the worm and continuing to move the tone arm inwardly at a more rapid rate than it would be fed in by the record. This will trip the switch and start the auxiliary motor into operation so that the cycle is carried out as though a record had been played. If desired, one may provide a circuit closer such as indicated at 59 in the wiring diagram to by-pass the motor starting switch 28. This circuit closer is held closed long enough to permit the auxiliary motor to close the motor running switch 29.

The auxiliary motor 26 may conveniently be mounted in the lower rear part of the phonograph cabinet. As here shown this motor is connected through a reduction gear box 30 with a slow motion shaft 61. A belt or any other form of speed reduction mechanism may be used for obtaining a drive for such a slow motion shaft. The shaft 61 is connected through a pair of bevelled pinions 62 with a vertical shaft 63 which extends upwardly inside the rear part of the phonograph cabinet. The upper end of this shaft is connected with a crank 64 which is utilized in operating the record changing and repeat mechanism, the arrangement being such that the entire cycle of operation is carried out during one revolution of the shaft 61 and crank 64. This crank is connected through a lost motion connection 65 (see Fig. 18) with a link 66 the other end of which is connected at 67 to an oscillatory ring 68 whereby the ring may be oscillated back and forth once for each cycle of operations. This ring surrounds the fixed throat 69 beneath the central support for the tone arm and is supported on ball bearings 69a carried on the ring 69b which supports the upper end of the sound amplifying horn D.

In the present form of construction, the transfer of records from the magazine to the platform, the raising and lowering of the reproducer, the placing of the tone arm in initial position, and the releasing of the selector switch, are accomplished through this link or connecting rod 66 and parts operated thereby and associated therewith. While this movement of the parts directly connected to it are here shown as oscillatory, it is to be understood that many of the back and forth movements may be longitudinally reciprocatory.

The record shifting mechanism is designated generally by the reference character H. As shown in the drawings this mechanism includes an oscillatory record shifting arm 70 pivotally mounted on a bracket 71 carried by the oscillating ring 68. This record shifting arm is able to pivot a considerable extent about a horizontal axis. It extends upwardly through an opening 72 in the phonograph table B, the shape of which is indicated more clearly in dot and dash lines in Figure 15.

The construction and operation of the record shifting mechanism is clearly shown in Figures 1, and 6 to 17, inclusive. The arm 70 may be conveniently made up of a metal strap having a long horizontal portion 73 adapted to sweep back and forth over the record magazine and part of the turn table. It carries a wooden cover 74 which conceals the mechanical parts, improves the appearance, and adds weight.

As here shown the reproducer lifting mechanism is operated by a cam 75 carried by the oscillating ring 68. This cam engages with a roller 76 Fig. 14 carried by a plunger 77 guided for vertical movement in bearings 78 and 79 in fixed parts 69 and 69b, respectively. The upper end 80 of the plunger is connected with a flexible member such as a chain or cord 81 which extends up over a guiding wheel 82 supported on bracket 83 in the rear of the pivotal mounting of the tone arm. The flexible cord 81 passes through an eye 84 directly over the pivotal axis 17 of the tone arm and then passes through the guides 85 and 86 and is connected at its farther end to the reproducer as indicated at 87. These parts are so arranged that when the oscillating ring 68 is shifted from the position shown in Figure 14 the plunger 77 is forced downwardly, thereby tensioning the flexible member and lifting the reproducer from the position where the stylus is in contact with the record up to the position indicated in Figures 6 and 9. As there indicated, this position is some distance above the upper end of the center pin 12 of the turn table.

The tone arm carried member 39, Fig. 18, disposed underneath the phonograph table and which has been described as actuating the automatic switch G, is also operatively associated with mechanism under the control of the connecting rod 66 and oscillating ring 68 for operating the tone arm in a predetermined manner. The ring 68 is provided with an arcuate cam 90 Fig. 15 having a lifting portion 91 and a long dwell portion. The portion 91 of this cam is adapted to actuate a gravity controlled lever 92 pivoted at 93 on a bracket 94 fastened on the throat 69 underneath the phonograph table, and to raise this member 92, from the full line position of Figure 14 to the position shown in Figure 16. The outer free end of the lever 92 carries an arc-shaped friction plate 95 provided with three notches 95', 96 and 97, as indicated in Fig. 17. When this plate is in the upper position, it engages frictionally with a spring 98 carried on an adjustable cross head 99 attached to the branch 39' of the tone arm operated member 39. The friction between these parts will offer some slight resistance to the swinging movement of the tone arm.

The link or connecting rod 66 is provided with an oblique cam surface 100 as indicated in Figures 15 and 18. During the initial movement of the connecting rod and parts carried thereby from the full line position of Figure 18 to the dot and dash line position, this cam surface 100 will be moved as indicated in this figure. During this movement the cam engages a roller 101 carried on a collar 102 fixed to a shaft 103. The shaft 103 is slidably and rotatably carried in bearing members 105 only one of which is shown. In order to prevent turning of the shaft 103 while the cam is moving the parts as described, the collar 102 carrying the roller 101 is arranged to slide along a fixed guide 107 carried underneath the phonograph table. A counter weight 108 carried by the shaft 103 turns the shaft back to the position shown in the drawing whenever turned out of that position. Sound deadening material may be used, if desired. The cam acts on the roller to shift the collar and shaft 103 from the full line position of Figure 18 to the dot and dash line position. The shaft 103 fixedly carries a tone arm push member 104 which is engageable with the arm 39' carried by the tone arm underneath the phonograph table.

The movement of the shaft 103 brought about by the cam 100 acting on the roller supported from the shaft, will bring the member 104 into engagement with the arm 39' and will thereby shift the tone arm inwardly bringing it to the dot and dash line position shown in Figure 8 where it will remain until acted upon by some other means either the record being transferred or record shifting mechanism to return the tone arm to a playing position. It is yieldably held in this position by the spring 98 entering into notch 95'.

It will of course be understood that this inward shifting movement of the tone arm is accomplished during the earlier part of the cycle and will always bring the tone arm and parts carried by it into a predetermined position no matter where they were when the motor starting switch was closed. This makes it certain that the reproducer support and associated parts are always moved in so as to be in position for subsequent operations in the cycle.

Assuming that the stack of records is placed in the record magazine with the upper record properly located and the circuit of the auxiliary motor has been closed by the switch 28, the operation of parts will be described. At first the circuit through the running switch 29 is open, the brush 29d being on the insulating segment. As soon as the motor has turned the shaft part way around, the brush 29d will ride onto the metal so that the later opening of this switch 28 will not stop the auxiliary motor.

Early in the shifting of the oscillatory ring 68, the plunger 77 is lowered to raise the stylus off the record and the bell crank shaped member 92 lifts the friction plate 95 up to engage the spring 98. The swinging record shifting arm 70 starts away from the position shown in Figure 1, where it has been at rest, to bring it out toward the record magazine.

The arm 70 carries a record engaging or pick up pin 110 cooperative with the center hole in the upper record in the storage magazine. The arm-shaped slot 72 Fig. 15 through which the record shifting arm extends is provided with a camming surface 72a which permits the arm 70 to lower as soon as it is moved forwardly from the position of Figure 1. The record engaging pin moves through the path indicated by dotted lines in Figure 7a so that, as this record shifting arm 70 is brought out of the compartment to the rear of the record magazine it will be able to lower under the influence of gravity to rest on the upper record in the magazine as indicated in Figures 6 and 13. The cam is so shaped that the arm engages the record behind the center hole and preferably inside the playing surface. The record shifting arm 70 then continues to move and brings the record engaging pin 110 by the center hole of the record, whereupon the pin drops into this hole and engages with the record to shift it laterally off the stack of records. This motion is indicated in Figure 6.

As soon as the record is moved away from the position of rest, the sides of the record engage with oppositely disposed guides 111 and 112, which are upwardly inclined so that the record is gradually brought to a higher elevation as the swinging arm continues its movement. This dragging up of the record facilitates separating the upper record from the one just below it. During this movement, the arm 70 is gradually raised while the record is carried up the slope as indicated in Figure 6 and 7a, and in dot and dash lines in Figure 8.

The path of the edges of ten and twelve inch records is indicated in Figure 1 by dot and dash arcs. After the record has passed part way up along the inclined portions of the guides it passes underneath a stationary pin 113 as indicated in Figure 7. At the time that the swinging arm has carried the record up far enough to bring the center of the record beyond the inclined guiding surfaces the record lowers or flattens out into a horizontal position so as to slide along the top or horizontal portions 111' and 112' of the guides, as indicated at the left of Figure 7.

As the record is further moved toward the center of the playing platform, it slides along the upper part of the guides until the edge of the record passes above the center pin 12 of the playing platform as indicated in Figure 7 and in dot and dash lines in Figure 8. The advancing edge of the record is brought underneath a finger 114 (see Figure 9) fixedly carried by the tone arm and engages with a pin 115 carried by this finger. At first some resistance is encountered as the spring 98 is in the notch 95'. Soon, however, the tone arm and all parts connected with it will be swung by the record to the right about the pivot 17.

When the record is in the position shown in dot and dash lines in Figure 8, it is supported at three points, the center pin and both guides. As it is moved beyond the guides, as indicated in Figure 1, it will be supported solely by the center pin. It will be prevented from tipping or tilting out of place by engagement with the finger 114 on one side of the pin and with the record shifting arm on the other side of the pin.

The record then continues its movement until the pin 110 on the record shifting arm is brought over the center pin 12 on the turn table whereupon the record will drop away from the record shifting arm down onto the rotating playing platform and be brought to speed. This is the extreme right hand position of the record shifting arm and on account of the lost motion pin and slot connection 65 between the crank 64 and the connecting rod 66, it will be apparent that the record shifting arm is stationary for an appreciable interval of time so that the record may be easily deposited on the platform. To facilitate the depositing of this record, the pin 12 may be slightly tapered and rounded at the top to receive the center hole in the record.

During the movement of the record shifting arm from the position of rest to place it over the center of the playing platform, the arm 70, as indicated in Figure 7a, has rested on top of the upper record in the record magazine and on this record as it is being transferred to bring it over onto the center pin 12. The slot 72 through which the record shifting arm passes is shaped to permit the arm to rest under the influence of gravity on the record when in these positions but this slot is provided with a camming surface 72b which limits the downward movement of the arm 70 about its horizontal pivot and prevents the arm from dropping down onto the record which has been deposited onto the turn table. The extent of this lowering of the record shifting arm is indicated in Figure 7a. In this manner the record shifting arm is prevented from coming in contact with the rotating records on the playing platform.

During the right hand movement of the record shifting arm, the reproducer lifting cam 75 has kept the reproducer up above the record so that the record can pass underneath the reproducer and stylus to engage the tone arm shifting finger 114, and the nose 101a of the cam 100 has passed beyond the collar 102 so that there is nothing to interfere with swinging the tone arm outwardly. The extent of this outward swinging movement of the tone arm is determined by the diameter of the record.

In case the record is a ten inch record the tone arm will have been swung to bring the free end of the spring 98 into engagement with the notch 96 in the plate 95 which will check the tone arm in the proper position according to the size of the record. In case the record which has been shifted is a twelve inch record, the tone arm will be pushed further to the right and will carry the spring 98 over into the notch 97 and check it there. This spring may be accurately located in a position relative to the tone arm by adjusting the cross head 99.

At the same time the arm 39 connected to the tone arm will have been moved by the record being shifted to the position indicated in dot and dash lines in Figures 1 and 19.

While the switch for the auxiliary motor is of the type shown in my Patent 1,715,873, above referred to, and is there shown as being reset direct from the tone arm, it is for convenience here shown as being reset by the auxiliary motor through the connecting rod 66. This connecting rod is provided with a pusher 120 having one face 121 engageable with a depending member 122 carried by the arm 41 of the automatic switch. This pusher member engages the depending projection 122 during a portion of the movement of the crank as indicated in Figure 19 and causes the arms 41 and 43 and parts carried thereby to swing bodily in a counter-clockwise direction about the pivot 42. During this movement the tip 123 of the resetting link 124 engages with a permanent stop 125. The link 124 is pivotally mounted on an arm of the member 48 and will cause this member 48 to pivot in a counter-clockwise direction about its axis 49 thereby causing the pin 52 carried by the lever member 47 to swing this lever member in a clockwise direction against the tension of the spring 55 until such time as the detent mechanism including these two levers, the pin and notch, becomes reset. This resetting opens the switch 28 but does not affect the operation of the auxiliary motor 26 as the circuit is closed by the by-pass including the rotary switch 29. This resetting of the motor starting switch 28 to open position is accomplished after the record has been deposited on the playing platform.

During the outward movement of the tone arm, the bracket 104 will have been moved back to the right as indicated in Figure 17 and will have drawn the shaft 103 and parts carried by it along with it. As the crank or connecting rod 66 is brought back from the position shown in Figure 19 to the position shown in Figures 15 and 18, the shoulder 100b will engage with the roller 101 and will turn the shaft 103 and all parts carried by it sufficiently to permit the crank to pass by the roller, whereupon the counterweight 108 returns the shaft 103 to the desired position.

The connecting rod 66 continues to turn the oscillating ring 68 backward and at the proper time brings the cam 75 past the roller 76 allowing the goose neck to lower the stylus and reproducer into cooperative relation with the record. It also carries the cam 90 back to the full line position of Figure 15 permitting the gravity controlled lever member 92 and friction plate carried thereby to gradually lower. This lever member does not lower, however, until after the stylus is deposited on the record surface. During this lowering movement of the plate 95 the spring 98 is allowed to expand and as the tip of the spring is held in the notch (96 or 97) the straightening out of the spring will bring about a slight inward movement of the tone arm thereby insuring that the stylus is moved across the record surface outside the playing area to bring it into the lead-in groove. The spring 98 is not strong enough to force the stylus out of a groove once it has entered it. This movement at the spring is very slight, but is multiplied by the lever arrangement so as to be in the neighborhood of one-sixteenth of an inch at the stylus. The record is then played in the usual manner.

Besides accomplishing the restoration of the stylus to the record and pushing the tone arm for initial playing position, the movement of the ring 68 and parts carried thereby operates on the uppermost record in the record magazine in a manner to be described.

The record magazine E is adapted to receive a repertoire of records either ten inch or twelve inch stacked on top of one another in any order. It is not necessary to accurately center the records in the magazine except that the top or uppermost record in the stack should be placed in a predetermined position, self determined by the size of the record and the shape and configuration of the record magazine. The lower records may be placed in the magazine in indeterminate relation and are brought one at a time to the predetermined position dependent upon the size of the particular record being placed. This record having been so placed, is the one which is removed during the next cycle of operations. The record storage magazine may conveniently be constructed in the form of a receptacle or pocket forming part of the phonograph table B and may conveniently be disposed slightly below the level of the playing platform. As indicated in the drawings the storage magazine has a sloping bottom 130. The general shape of the bottom of this receptacle is circular and is made large enough to receive a twelve inch record. This bottom wall slopes downwardly to the left and toward the rear of the cabinet so that the records therein may be moved leftwardly and rearwardly against the lower side walls of the receptacle and so that the receptacle is free of obstructions on the right front side.

The storage magazine is provided with side walls 131 and 132 which extend upwardly from the bottom 130 of the record receptacle. These side walls 131 and 132 are as indicated in the drawings placed at an acute angle to the bottom 130 and slope inwardly in varying degrees, whereby either a ten inch or a twelve inch record may be disposed in a predetermined position dependent upon its position in the stack. For instance, if all of the records in the stack are twelve inch records and they are brought against the side walls 131 and 132, the records will be brought to a predetermined position defined by the points of contact of the peripheries of the records with the side walls of the record magazine. These records, however, will not be directly on top of one another but are slightly offset or placed in echelon with their center holes in the path of the pick up pin 110. As this pick up pin, however, does not move in a vertical plane on account of its lowering about the horizontal pivot, the record centers are offset to receive the pivot pin at the various elevations and according to its position in the stack. The offsetting of record centers is indicated by the center line 136.

The side walls 131 and 132 are also so shaped as to receive ten inch records and to locate these records when their peripheries are brought against the portions of the side walls in such a manner that their center holes are offset relative to one another and in the path of the pick up pin 110 as it swings over the record magazine and is raised or lowered in accordance with the number of records in the stack.

It will, of course, be understood that the angular relation of the bottom or record bearing part of the magazine with its side walls may be varied, together with the position of the horizontal axis or joint of the record shifting arm, so long as the loci of record centers intersects the path of the record shifting pin and permits the pin to engage the center hole of the records in the stack.

In the previous description, the transfer of the uppermost record from the stack in the magazine to the playing platform has been described. It was assumed that the second and other records in the stack were placed in the storage area in indeterminate relation. Assuming that the second record of the stack was placed as indicated in full lines in Figure 10, the operation of placing this record in a predetermined position will now be described.

As indicated in Figures 10 and 11, the edge of the record b projects to the right of the other records in the stack. The swinging record shifting arm 70, during its return movement after the depositing of the first record on the playing platform, is, as shown in Figure 7a, held out of contact with this record on the playing platform and is not lowered until after it is clear of the playing platform. The cam 72b then allows the arm 70 to lower under the influence of gravity. The outer end of the record shifting arm 70 has a shoe or other device 133 which is brought against the edge of the record b as indicated in Figures 10 and 11. This will push the record from the full line position indicated in Figure 10 to the dot and dash line position bringing the periphery of the record against the side wall 131 of the record receptacle. During this motion the center hole in the record has moved through the path indicated by the small circles and arrows. During this swinging movement of the record shifting arm 70 the shoe 133 has cammed the arm upwardly, as indicated in Figure 7a, so that it rides up over the top record.

Further motion of the record shifting arm 70 toward the left will cause the record b to roll downwardly to bring it to the dotted line position of Figure 10. To increase the friction between the arm and record and further facilitate the movement of the record down into the corner of the record magazine the record shifting arm carries a friction pad 134 placed between the shoe 133 and the pick up pin 110. This pick up pin is pivoted on the axis 135 and is moved to the position indicated in Figure 12 so that it will not scratch the record.

This positioning operation on the upper record of the stack during the return movement of the record shifting arm is carried out on the upper record in the magazine and will force it to the limiting position as defined by the side walls 131 and 132 of the storage magazine bringing the center hole of the record and its position in the stack so that this center hole will be in the path of the pick up pin 110 when it is returned to transfer the record to the playing platform. It will of course be understood that the shape given these various parts will be varied according to the exigencies of the situation and that the present detailed showing is merely illustrative.

After the record shifting arm has passed beyond the center of the upper record in the storage magazine and has placed this record in position, the arm is brought against the cam surface 72a so as to raise the arm up away from the stack of records and to carry it back to the initial position as indicated in Figures 1, 3 and 7a. When in this position, the record shifting arm may, if desired, be housed in a substantially closed box 137a carried in the rear left corner of the phonograph cabinet and provided with an opening 137 to receive the record shifting arm.

At this extreme position the brush 29d of the switch 29 is brought onto the insulating segment 29b, opening the circuit for the auxiliary motor. The record shifting arm comes to this position at the same time that the lost motion pin and slot connection 65 between the crank 64 and the connecting rod 66 comes into play. This lost motion connection permits the record shifting arm and these parts to remain stationary during the overrun of the motor after the switch 29 has been opened.

The operations which have been so far described will be carried out as long as there are records in the storage magazine to be played. That is to say, the phonograph will play a record placed on the playing platform after which the record shifting arm will bring the next record of the repertoire to the playing platform and deposit it in position, the resetting of the tone arm to position and operation of switches being carried out in the proper sequence. Succeeding records will be brought to the proper position in the storage magazine and then transferred to the playing platform one at a time. Besides the playing of the record of the repertoire one after another in succession, the present invention contemplates the setting of the selector switch to permit carrying out the various operations set forth above.

Assume that the selector switch F has been moved to the position indicated in Figures 21, and 25. This is the proper setting where one intends to play records automatically in succession as long as there are records in the magazine to be played, and after the last record has been played once, to play it again from the ten inch position, and then allow the machine to stop.

The selector switch F is placed underneath the table B and is provided with an operating knob 140 disposed above the table B and carried between the guides 111 and 112 so that the records being transferred will pass up over this switch knob without interference. The selector switch is also provided with a pointer 141 adapted to be set manually to any of the four indications "single", "multiple", "repeat", "off". These indications are carried on an indicia plate 142.

The knob 140 is fastened to a shaft 143 which carries the conducting ring 18 so that this ring can be set to locate the camming portions thereof in the desired position. This shaft is carried in a supporting frame 144 suitably mounted underneath the phonograph table. This frame is provided with a bracket 145 to support an insulating slab 146 provided with guides 147 to 152, inclusive, for the plungers 32, 22 and 24. It also supports the contacts 23, 25 and 31. Springs 153, 154 and 155 are provided to push the plungers over against the ring 18. When the parts are in the position indicated in Figure 21, the contacts 22 and 23 and the contacts 24 and 25 are in engagement to connect the circuits as above described, while the contact 32 is separated from the contact 31.

The lower end of the shaft 143 is provided with a gear 156 in mesh with a mutilated gear 157 carried on a countershaft 158. This countershaft is connected to a spring 159 whose free end 160 is anchored in the support. The shaft 143 is also provided with a disk 161 having a notch 162 cooperative with the spring pressed pawl 163. This arrangement of parts permits turning the knob 140 around in a clockwise direction without overwinding the spring 159. The mutilated gear permits thus rotating the knob in the same direction, the teeth being so arranged that additional tension can not be placed on the spring 159 after the knob has been turned past the "repeat" position. The pawl 163 cooperates in stopping the switch in the "off" position when released by the escapement mechanism to be described.

The selector switch is provided with escapement mechanism under the control of the record shifting mechanism and so associated with it that the selector switch is automatically changed from the "multiple" position to the "single" position when the record shifting mechanism goes through its cycle of operations in the absence of a record to be shifted. This same escapement mechanism also permits the selector switch to automatically shift from the "single" position to the "off" position whenever the record shifting mechanism is again actuated without transferring a record.

In actuating the selector switch, advantage is taken of the fact that, when no record is being transferred, the record shifting arm passes through a different path than when a record is being transferred. The difference in this path is most clearly indicated in Figure 19 where it appears that when a record is being transferred, the record shifting arm passes upwardly as the record travels up the inclined surfaces of the guides and moves horizontally until the record is deposited. After the record has been deposited the record shifting arm comes back as indicated in the dotted lines to the position of rest. When, however, the record shifting arm is actuated in the absence of a record, the arm descends all the way to the bottom of the record magazine, is carried along the bottom of this magazine until the portion 72b Fig. 15 of the cam operates on it to raise it up clear of the turn table. This portion of its path is indicated in Figure 7a by the feathered arrow. The selector switch is actuated during the portion of the movement of the record shifting arm wherein it is supported by the cam 72b instead of by a record being shifted.

As more clearly shown in Figures 2, 14 and 15, the record shifting arm 70 extends downwardly below the bracket 71. This downward extension is indicated at 170 and as shown in the drawings has an outwardly and downwardly extending tip 171. It will be apparent that this tip 171 will swing about the vertical axis with the record shifting arm and will also swing about the horizontal axis so as to travel through paths corresponding with those of the pick up pin 110, illustrated in Figure 7a. This path would be the same shape as there indicated but the extent of movement would be much smaller. This finger 171 is utilized to actuate the escapement mechanism for the selector switch.

This escapement mechanism is under the control of a plunger 172 carried in a guide 173 and pressed rearwardly by a spring 174. The lower rear end of the plunger 172 carries a slidable rotatable finger 175 having an upwardly extending projection 176. This finger is under the control of a coiled spring 177 which presses it forwardly and which holds it against a stop 178. When the record shifting mechanism functions with a record, the finger 171 passes upwardly without engaging the finger 175 or any of the parts associated with it. During the return movement of the record shifting arm the finger 171 engages the upwardly projecting part 176 of the finger 175 and turns it on its axis as indicated in Figure 22a and cams it back compressing the spring as indicated in Figure 22 thereby permitting the record shifting mechanism to pass by the parts carried by the plunger 172 without actuating the plunger 172.

When, however, the record shifting mechanism operates in the absence of a record to shift, the finger 171, as it moves with the arm 70, is carried in behind the finger 176 engaging with this finger and pushing the finger and plunger 172 toward the front of the cabinet moving it in the direction of the arrow shown in the lower part of Figure 23, this motion of the plunger 172 being accomplished by the record shifting mechanism before the cam 72b has raised the record shifting arm up above the turntable. The front end of the plunger 172 is connected with an escapement lever 180 mounted underneath the switch parts and held against the plunger by a light spring 180'. This escapement finger has a bifurcated end provided with two tips 181 and 182 which are cooperative with stops 183, 184 and 185 carried by the selector switch shaft 143 and insulated from the contact portions of the selector switch.

When the plunger 172 is pushed forwardly by the record shifting mechanism in the absence of a record being shifted, the finger 181 is carried past the stop 182 permitting the spring 159 to operate through the gearing to rotate the selector switch shaft 143 backward. This brings the stop 183 against the side 182 of the escapement finger 180 temporarily arresting the selector switch. As soon, however, as the finger 171 on the record shifting mechanism has passed beyond the finger 175, spring 174 moves the plunger 172 rearwardly allowing the stop 183 to pass by the point 182 on the finger, whereupon the spring 159 will again act on the selector shaft to bring the next stop 184 on the selector switch against the tip 181 on the escapement mechanism.

During this operation the selector switch parts will have been shifted from the "multiple" position as shown in Figure 1 to the "single" position as indicated in Figure 8. This will have changed the circuit arrangement in the selector switch. The follower 32 will have moved down along the cut away portion 19' of the selector switch so as to bring this follower against the contact 31 by-passing the intermission controlling switch 27 where one is used.

During this movement of the record shifting mechanism in the absence of a record, the reproducer support is shifted to the initial position for a ten inch record so that the last record on the stack of records will be played from the ten inch position as a signal to indicate that the repertoire of records has been completed, and, as the switch 32 has by-passed the intermission control switch 27, this playing will take place immediately upon the restoration of the stylus to the record. The operation of the mechanism for effecting the setting of the reproducer to the ten inch position in the absence of a record being shifted is indicated in Figure 8. The record shifting arm 70 engages the reproducer support at some convenient point on either the tone arm or the goose neck so as to swing the reproducer support nearly to the ten inch position. This engagement is impossible when a record is being shifted because the edge of the record reaches the pin 115 to set the reproducer according to the size of the record.

In the absence of a record, however, the record shifting arm, as has just been stated, pushes the reproducer support nearly to the ten inch position as indicated in Figure 8. The accurate placing of the reproducer in this position, however, is accomplished by a cam 190 carried on the link or connecting rod 66. As shown in Figures 18, 19 and 20 this cam 190 is carried adjacent a downwardly extending lug or pin 191 carried by the member 39 connected to the tone arm. This lug will be moved into the path of the cam 190 when the tone arm has been brought out nearly to the ten inch position by the record shifting arm. At the proper time as indicated in Figure 19, the cam 190 will engage with the pin 191 and will move the arm 39 and tone arm to the 10 inch position causing the spring 98 to enter into the notch in the friction or check plate 95. The record shifting mechanism goes through the remaining functions as though it had deposited a record and the record is played from the ten inch position. During the return movement, the record shifting mechanism has no effect on the selector switch.

After the completion of the playing of this record, the auxiliary motor is again energized in the usual manner, and the record shifting mechanism goes through its movements, again in the absence of a record. This time the escapement mechanism operates to release the lug 184 on the selector switch permitting the selector switch to turn another quarter of a revolution bringing the pointer to the "off" position, where it is stopped by the pawl 163. This will cause the plunger 22 to ride down into the cam surface 20' opening the circuit for the platform motor and permitting it to stop. It will also open the circuit between the contacts 24 and 25. The auxiliary motor, however, will continue to be supplied by current through the circuit provided by the switch points 31 and 32, and will continue to run until the auxiliary motor has carried the record shifting mechanism through a complete cycle of operations so as to bring the brush 29e again onto the insulating segment 29b whereupon both the motors are disconnected from the circuit and the apparatus stops with the record shifting arm back in the compartment provided for it and with the stylus resting on the upper record on the platform. The records may then be removed from the platform in an obvious manner.

When it is desired to repeat a single record indefinitely, this record is placed on the playing platform, no records are placed in the magazine, and the selector switch is moved to the "repeat" position, being held there by the overhanging lug 185 engaging the extension 181' on finger 181. In this position the selector switch is out of the range of action of the escapement mechanism and is held in this position until manually moved from it. The circuit arrangement is the same as indicated in Figure 25 in the drawings and the phonograph will repeat this record on the platform indefinitely, the time between various renditions of the record being under the control of the intermission control switch 27 where such a switch is used.

If the selector switch is placed in the "repeat" position and a selection of records placed in the magazine so that the phonograph acts as a multiple record machine, the last record will be repeated indefinitely as is obvious from the foregoing description.

When it is desired to play a single record once, after which the phonograph is stopped, the record is placed on the playing platform and the selector switch set in the "single" position. A series of records may be played with the selector switch in this position and the phonograph will stop after the last record.

The mechanism for controlling the time and interval between records is designated here merely by the switch 27. This intermission switch, its operating mechanism and controls forms the subject matter of an application for Letters Patent, Serial No. 285,247 filed by the present applicant on June 14, 1928, and now matured into Patent No. 1,812,454, granted June 30, 1931.

While the present description relates to a phonograph wherein the record shifting mechanism is passed through a cycle from the starting point set forth, it is possible to start the cycle at other points. For example, the record shifting arm may stop in an intermediate position between the magazine and playing platform. Thus the record will be brought to about the dot and dash position of Figure 7 before the auxiliary motor stops; and the record is held there until the motor is started. If the cycle is operated from this starting point, a very much shorter time between records is possible.

While the form of multiple record phonograph herein shown is of a construction to retain the record on the platform after it has been played, and to pile succeeding records on top of the one first played, it is to be understood that the invention is not necessarily limited to such operation. One may employ suitable means for rejecting a record after it is played.

I claim:

1. In a phonograph, the combination with a rotatable playing platform adapted to support a plurality of records, and a movable reproducer and stylus cooperative with the upper record thereon for playing said record, of a magazine adapted to receive and support a repertoire of records stacked on top of one another in indeterminate relation, and automatic record changing mechanism automatically set into operation upon the completion of the playing of a record to carry out a cycle of operations, whereby the records in said stack are transferred to the playing platform one at a time and playing successively thereon.

2. In a phonograph, the combination with a rotatable playing platform adapted to support a plurality of records, and a movable reproducer and stylus cooperative with the upper record thereon for playing said record, of a magazine adapted to receive and support a repertoire of records stacked on top of one another in indeterminate relation, said magazine being to one side of the playing platform and having its bottom at about the same elevation as the playing platform, and automatic record changing mechanism automatically set into operation upon the completion of the playing of a record to carry out a cycle of operations, whereby the records in said stack are successively transferred to be placed above the playing platform, then deposited on the platform, and then played thereon.

3. In a phonograph, the combination with a rotatable playing platform adapted to support a plurality of records, and a movable reproducer and stylus cooperative with the upper record thereon for playing said record, of a magazine adapted to receive and support a repertoire of records stacked on top of one another in indeterminate relation, and automatic record changing mechanism automatically set into operation upon the completion of the playing of a record to carry out a cycle of operations, whereby the records in said stack are transferred to the playing platform one at a time and played successively thereon, said record changing mechanism and the support for the reproducer having cooperative devices for setting the reproducer in a predetermined playing position when the record changing mechanism is carried through the record transferring operation in the absence of a record, said devices being non-functioning when a record is transferred.

4. In a phonograph, the combination with a rotatable playing platform adapted to support a plurality of records, and a movable reproducer and stylus cooperative with the upper record thereon for playing said record, of a magazine adapted to receive and support a repertoire of records stacked on top of one another in indeterminate relation, and automatic record changing mechanism automatically set into operation upon the completion of the playing of a record to carry out a cycle of operations, whereby the records in said stack are transferred to the playing platform one at a time and played successively thereon, said record changing mechanism including means for shifting the reproducer support to pre-playing position and for yieldingly holding the reproducer in said position until the cycle of operations is about to be completed.

5. In a phonograph, the combination with a cabinet having a phonograph table across the top, a rotatable playing platform above the table adapted to support a plurality of records, a movable reproducer and stylus carried by a swinging tone arm and cooperative with the upper record thereon for playing said record, and a sound amplifying horn underneath the table, of a magazine forming a part of said table and adapted to receive and support a repertoire of records stacked on top of one another in indeterminate relation, and automatic record changing mechanism automatically set into operation upon the completion of the playing of a record to carry out a cycle of operations, whereby the records in said stack are transferred across the top of the table to the playing platform one at a time and played successively thereon.

6. In a phonograph, the combination with a cabinet having a phonograph table across the top, a rotatable playing platform above the table adapted to support a plurality of records, a movable reproducer and stylus carried by a swinging tone arm and cooperative with the upper record thereon for playing said record, and a sound amplifying horn underneath the table, of a magazine forming a part of said table and adapted to receive and support a repertoire of records stacked on top of one another in indeterminate relation, and automatic record changing mechanism automatically set into operation upon the completion of the playing of a record to carry out a cycle of operations, whereby the records in said stack are transferred across the top of the table to the playing platform one at a time and played successively thereon, said record changing mechanism including an oscillatory member surrounding a portion of said horn below the pivot for the tone arm and actuating the record transfer means.

7. A phonograph having means for successively playing a repertoire of various sized records from a record magazine wherein they are stacked on top of one another, said means including means independent of the reproducer stylus for automatically presetting the reproducer of the phonograph to a new initial position for each record to be played in accordance with the diameter of said record, means acting, in the absence of a record being transferred, to move the reproducer at least far enough for the initial position on the smaller sized record, and means for returning the stylus to the playing surface of the record previously played.

8. A phonograph having means for successively playing a repertoire of various sized records from a record magazine wherein they are stacked on top of one another in indeterminate relation, said means including means for sliding the upper record laterally from the magazine to position it directly above the playing position and simultaneously and automatically presetting the reproducer of the phonograph to a new initial position for said record in accordance with the diameter of said record.

9. A phonograph having means for successively playing a repertoire of various sized records from a record magazine wherein they are stacked on top of one another in indeterminate relation, said means including means for moving the upper record of the stack to a predetermined position in the magazine, and means for moving it to a position directly above the playing position and simultaneously and automatically presetting the reproducer of the phonograph to a new initial position for said record in accordance with the diameter of said record.

10. A phonograph having means for successively playing a repertoire of various sized records from a record magazine wherein they are stacked on top of one another, said means including means for automatically presetting the reproducer of the phonograph to a new initial position for each record to be played in accordance with the diameter of said record, and means for holding the reproducer against movement in either direction out of said preset position until the stylus thereof is to be returned to playing position.

11. In a phonograph, the combination with a rotatable playing platform adapted to support a plurality of records, and a movable reproducer and stylus cooperative with the grooves in the record and adapted to be moved thereby across the platform, of a record magazine for records of various sizes, and automatic record changing mechanism automatically set into operation upon the completion of the playing of a record to carry out a predetermined cycle of operations, said record changing mechanism including means for bringing the edge of the record being transferred against a member moving with the reproducer about a common axis and located close to the stylus, but independent thereof, for moving the stylus to an initial playing position for each record in accordance with the diameter of said record.

12. In a phonograph, the combination with a rotatable playing platform adapted to support a plurality of records, and a movable reproducer and stylus cooperative with the grooves in the record and adapted to be moved thereby across the platform, of a record magazine for records of various sizes, and automatic record changing mechanism automatically set into operation upon the completion of the playing of a record to carry out a predetermined cycle of operations, including raising the stylus off the record after it has been played and returning it to the succeeding record, said record changing mechanism including means for bringing the edge of the record being transferred against a member moving with the reproducer and located close to the stylus, but independent thereof, for moving the stylus to an initial playing position for each record in accordance with the diameter of said record, and means for maintaining the stylus in such position until the stylus is lowered.

13. In a phonograph, the combination with a rotatable playing platform adapted to support a plurality of records, and a swinging arm carrying a reproducer and stylus cooperative with the grooves in the record and adapted to be moved thereby across the platform, of a record magazine for records of various sizes, and automatic record changing mechanism automatically set into operation upon the completion of the playing of a record to carry out a predetermined cycle of operation, said record changing mechanism including a movable record shifting arm movable toward and away from the center of the playing platform and adapted to transfer records from the magazine to the playing platform, the edge of the record being transferred, being thereby brought against a member moving with the swinging arm about a common axis and located close to the stylus but independently thereof to move the stylus above an initial playing position for that record in accordance with the diameter of that record.

14. In a phonograph, the combination with a rotatable playing platform adapted to support a plurality of records, and a movable reproducer and stylus cooperative with the grooves in the record and adapted to be moved thereby across the platform, of a record magazine for records of various sizes, and automatic record changing mechanism automatically set into operation upon the completion of the playing of a record to carry out a predetermined cycle of operations, said record changing mechanism including means for sliding the upper record laterally from the magazine to a position directly above the playing position and bringing the edge of the record being transferred against a member above the platform and moving with the reproducer to move the stylus above an initial playing position for that record in accordance with the diameter of that record, whereupon the record is deposited on the platform leaving the swinging arm in position.

15. In a phonograph, the combination with a rotatable playing platform adapted to support a plurality of records, and a movable reproducer and stylus cooperative with the grooves in the record and adapted to be moved thereby across the platform, of a record magazine for records of various sizes, and automatic record changing mechanism automatically set into operation upon the completion of the playing of a record to carry out a predetermined cycle of operations, said changing mechanism including means for bringing the edge of the record being transferred against a member moving with the reproducer and located close to the stylus, but independent thereof, for moving the stylus above an initial playing position for each record in accordance with the diameter of said record, means acting, in the absence of a record being transferred, to move the reproducer at least far enough for the initial position on the smaller sized record, and means for returning the stylus to the playing surface of the record previously played.

16. In a phonograph, the combination with a rotatable playing platform adapted to support a plurality of records, and a movable reproducer and stylus cooperative with the grooves in the record and adapted to be moved thereby across the platform, of a record magazine for records of various sizes, and automatic record changing mechanism automatically set into operation upon the completion of the playing of a record to carry out a predetermined cycle of operations, said record changing mechanism including means for bringing the edge of the record being transferred against a member moving with the reproducer to move the stylus above an initial playing position for each record in accordance with the diameter of said record, and devices for holding the reproducer in the position to which it has been shifted, until the stylus is to be returned to playing position.

17. In a phonograph, the combination with a rotatable playing platform adapted to support a plurality of records, and a swinging arm carrying a reproducer and stylus cooperative with the grooves in the record and adapted to be moved thereby across the platform, of a record magazine for records of various sizes, and automatic record changing mechanism automatically set into operation upon the completion of the playing of a record to carry out a predetermined cycle of operation, said record changing mechanism including a movable record shifting arm movable toward and away from the center of the playing platform and adapted to transfer records from the magazine to the playing platform, the edge of the record being transferred being thereby brought against a member moving with the swinging arm to swing the stylus above an initial playing position for that record in accordance with the diameter of that record, said record changing mechanism, and the support for the reproducer having cooperative devices for setting the reproducer in a predetermined playing position when the record changing mechanism is carried through the record transferring operation in the absence of a record, said devices being non-functioning when a record is transferred.

18. In a phonograph, the combination with a rotatable playing platform adapted to support a plurality of records, and a movable reproducer and stylus cooperative with the upper record thereon, for playing said record, of a magazine adapted to receive and support a plurality of records of differing sizes stacked on top of one another in indeterminate relation, and automatic record changing mechanism automatically set into operation upon the completion of the playing of a record for carrying out a predetermined cycle of operations, whereby the top record in said magazine is moved to a predetermined position therein and is then transferred to the playing platform and played thereon, the record, during the latter part of its transfer, having its edge engaged with a member partaking of the horizontal movement of the reproducer support and moving the reproducer to initial playing position according to the diameter of the record, said member engaging the record and holding it out of contact with the stylus.

19. In a phonograph, the combination with a rotatable playing platform adapted to support a plurality of records, and a movable reproducer and stylus cooperative with the grooves in the record and adapted to be moved thereby across the platform, of a motor, a normally open motor starting switch, record-controlled switch closing means for starting said motor upon the completion of the playing of a record, a motor-operated circuit controlling means for opening the circuit of the motor after a predetermined cycle has been carried out, a record magazine for records to be played, and motor operated means for transferring records from the magazine to the playing platform and automatically locating the reproducer in accordance with the diameter of the record so as to be in the initial playing position for said record, said reproducer locating being effected by the interengagement of the record and a member movable with the reproducer.

20. In a phonograph, the combination with a rotatable playing platform adapted to support a plurality of records, and a movable reproducer and stylus cooperative with the grooves in the record and adapted to be moved thereby across the platform, of a motor, a normally open motor starting switch, record-controlled switch closing means for starting said motor upon the completion of the playing of a record, a motor-operated circuit controlling means for opening the circuit of the motor after a predetermined cycle has been carried out, a record magazine for records to be played, and motor operated means for transferring records from the magazine to the playing platform and automatically locating the reproducer in accordance with the diameter of the record so as to be in the initial playing position for said record, said motor operated means and reproducer having cooperative devices for setting the reproducer in predetermined playing position when the record changing mechanism is carried through a record transferring operation in the absence of a record, said devices being non-functioning when a record is transferred.

21. In a phonograph, the combination with a rotatable playing platform adapted to support a plurality of records, and a movable reproducer and stylus coperative with the grooves in the record and adapted to be moved thereby across the platform, of a motor, a normally open motor starting switch, record-controlled switch closing means for starting said motor upon the completion of the playing of a record, a motor-operated circuit controlling means for opening the circuit of the motor after a predetermined cycle has been carried out, a record magazine for records to be played, motor operated means for transferring records from the magazine to the playing platform and automatically locating the reproducer in accordance with the diameter of the record so as to be in the initial playing position for said record, and a motor positioned device for holding the reproducer against accidental movement during the record transferring operation.

22. In a phonograph, the combination with a rotatable playing platform adapted to support a plurality of records, and a movable reproducer and stylus cooperative with the grooves in the record and adapted to be moved thereby across the platform, of a motor, a normally open motor starting switch, record-controlled switch closing means for starting said motor upon the completion of the playing of a record, a motor-operated circuit controlling means for opening the circuit of the motor after a predetermined cycle has been carried out, a record magazine for records to be played, motor operated means for transferring records from the magazine to the playing platform and automatically locating the reproducer in accordance with the diameter of the record so as to be in the initial playing position for said record, and a device under the control of the motor for maintaining the reproducer in said position until the record is to be played.

23. In a phonograph, the combination with a rotatable playing platform adapted to support a plurality of records, and a swinging arm carrying a reproducer and stylus cooperative with the grooves in the record and adapted to be moved thereby across the platform, of a motor, a normally open motor starting switch, record-controlled switch closing means for starting said motor upon the completion of the playing of a record, a motor-operated circuit controlling means for opening the circuit of the motor after a predetermined cycle has been carried out, a record magazine for records to be played, an oscillatory member pivoted about the same axis as the swinging arm and operatively connected with the motor, and a record shifting arm carried by said oscillatory member and engageable with the center hole in a record in the magazine to shift it from the magazine to the playing platform.

24. In a phonograph, the combination with a rotatable playing platform adapted to support a plurality of records, and a swinging arm carrying a reproducer and stylus cooperative with the grooves in the record and adapted to be moved thereby across the platform, a motor, a normally open motor starting switch, record-controlled switch closing means for starting said motor upon the completion of the playing of a record, a motor-operated circuit controlling means for opening the circuit of the motor after a predetermined cycle has been carried out, a record magazine for records to be played, an oscillatory member pivoted about the same axis as the swinging arm and operatively connected with the motor, a record shifting arm pivotally carried on said oscillatory member to swing about a horizontal axis and engageable with the center hole in a record in the magazine to shift it from the magazine to the playing platform, and a stationary cam for raising the record shifting arm in certain positions of its travel.

25. In a phonograph, the combination with a rotatable playing platform adapted to support a plurality of records, and a swinging arm carrying a reproducer and stylus cooperative with the grooves in the record and adapted to be moved thereby across the platform, a motor, a normally open motor starting switch, record-controlled switch closing means for starting said motor upon the completion of the playing of a record, a motor-operated circuit controlling means for opening the circuit of the motor after a predetermined cycle has been carried out, a record magazine adapted to receive and support a repertoire of records stacked on top of one another in indeterminate relation, an oscillatory member pivoted about the same axis as the swinging arm and operatively connected with the motor, and a record shifting arm carried by said oscillatory member and engageable, while moving in one direction, with the upper record in the magazine to shift it to a predetermined position, and engageable on its return movement with the center hole in said record to shift it from the magazine to the playing platform, the record shifting arm being pivoted on a horizontal axis, and a stationary cam for raising the record shifting arm in certain portions of its travel.

26. In a phonograph, the combination with a rotatable playing platform adapted to support a plurality of records, and a movable reproducer and stylus cooperative with the grooves in the record and adapted to be moved thereby across the platform, of a motor, a normally open motor starting switch, record-controlled switch closing means for starting said motor upon the completion of the playing of a record, a motor-operated circuit controlling means for opening the circuit of the motor after a predetermined cycle has been carried out, a record magazine for records to be played, a reciprocatory member operatively conected with the motor, a record shifting arm carried by said reciprocatory member and engageable with the center hole in a record in the magazine to shift it from the magazine to the playing platform, devices operated by the reciprocatory member for lifting the reproducer after the completion of the playing of the record, and means for thereafter shifting the reproducer toward the center of the playing platform.

27. In a phonograph, the combination with a rotatable playing platform adapted to support a plurality of records, and a swinging arm carrying a reproducer and stylus cooperative with the grooves in the record and adapted to be moved thereby across the platform, of a motor, a normally open motor starting switch, record-controlled switch closing means for starting said motor upon the completion of the playing of a record, a motor-operated circuit controlling means for opening the circuit of the motor after a predetermined cycle has been carried out, a record magazine for records to be played, an oscillatory member pivoted about the same axis as the swinging arm, a motor operated link for actuating the member, and a record shifting arm carried by said oscillatory member and engageable with the center hole in a record in the magazine to shift it from the magazine to the playing platform, a stationary cam for raising the record shifting arm in certain positions in its travel, devices operated by the oscillatory member for lifting the reproducer after the completion of the playing of the record, and a member carried by the swinging arm and engageable by a motor operated member for thereafter shifting the swinging arm toward the center of the playing platform.

28. In a phonograph, the combination with a rotatable playing platform adapted to support a plurality of records, and a movable reproducer and stylus cooperative with the grooves in the record and adapted to be moved thereby across the platform, of a motor, a normally open motor starting switch, record-controlled switch closing means for starting said motor upon the completion of the playing of a record, a motor-operated circuit controlling means for opening the circuit of the motor after a predetermined cycle has been carried out, a record magazine for records to be played, a reciprocatory member operatively connected with the motor, devices operated by the reciprocatory member for lifting the reproducer after the completion of the playing of the record, and means for thereafter positively shifting the reproducer to a predetermined point adjacent the center of the playing platform.

29. In a phonograph, the combination with a rotatable playing platform adapted to support a plurality of records, and a swinging arm carrying a reproducer and stylus cooperative with the grooves in the record and adapted to be moved thereby across the platform, of a motor, a normally open motor starting switch, record-controlled switch closing means for starting said motor upon the completion of the playing of a record, a motor-operated circuit controlling means for opening the circuit of the motor after a predetermined cycle has been carried out, a record magazine for records to be played, an oscillatory member pivoted about the same axis as the swinging arm and operatively connected with the motor, devices operated by the oscillatory member for lifting the reproducer after the completion of a playing of the record, and means for thereafter shifting the swinging arm toward the center of the playing platform.

30. In a phonograph, the combination with a rotatable playing platform adapted to support a plurality of records, and a swinging arm carrying a reproducer and stylus cooperative with the grooves in the record and adapted to be moved thereby across the platform, of a motor, a normally open motor starting switch, record-controlled switch closing means for starting said motor upon the completion of the playing of a record, a motor-operated circuit controlling means for opening the circuit of the motor after a predetermined cycle has been carried out, a record magazine for records to be played, an oscillatory cam member pivoted about the same axis as the swinging arm, a motor operated member for actuating the cam, devices operated by the cam member for lifting the reproducer after the completion of the playing of the record, and a device engageable with the motor operated member for thereafter shifting the swinging arm toward the center of the playing platform.

31. In a phonograph, the combination with a rotatable playing platform adapted to support a plurality of records, and a swinging arm carrying a reproducer and stylus cooperative with the grooves in the record and adapted to be moved thereby across the platform, of a motor, a normally open motor starting switch, record-controlled switch closing means for starting said motor upon the completion of the playing of a record, a motor-operated circuit controlling means for opening the circuit of the motor after a predetermined cycle has been carried out, a record magazine for records to be played, an oscillatory cam member pivoted about the same axis as the swinging arm, a motor operated link for actuating the cam member, devices operated by the oscillatory member for lifting the reproducer after the completion of the playing of the record, and a member associated with the swinging arm and engageable by a motor operated member for thereafter shifting the swinging arm toward the center of the playing platform.

32. A phonograph comprising, a rotatable playing platform adapted to support a plurality of records, a platform motor for driving the same, a platform motor controlling switch, a movable arm carrying a reproducer and stylus cooperative with the grooves in the record and adapted to be moved thereby across the platform, an auxiliary motor, a normally open starting switch for the auxiliary motor, record-controlled switch closing means for starting said auxiliary motor upon the completion of the playing of a record, an auxiliary motor-operated circuit controlling means for opening the circuit of the auxiliary motor after a predetermined cycle has been carried out, a record magazine for records to be played, and a record shifting arm operated by the auxiliary motor during said cycle for shifting a record from the magazine to the playing platform, the platform motor control switch being under the control of the record shifting arm and opened thereby in the absence of a record to be transferred.

33. A phonograph comprising, a rotatable playing platform adapted to support a plurality of records, a platform motor for driving the same, a platform motor controlling switch, a movable arm carrying a reproducer and stylus cooperative with the grooves in the record and adapted to be moved thereby across the platform, an auxiliary motor, a normally open starting switch for the auxiliary motor, record-controlled switch closing means for starting said auxiliary motor upon the completion of the playing of a record, an auxiliary motor-operated circuit controlling means for opening the circuit of the auxiliary motor after a predetermined cycle has been carried out, a record magazine for records to be played, a record shifting arm operated by the auxiliary motor during said cycle for shifting a record from the magazine to the playing platform and setting the reproducer in initial playing position according to the size of the record being transferred, and means whereby the platform motor control switch may be actuated toward open position by the movement of the record shifting arm in the absence of a record, this switch being capable of being preset to require a predetermined number of such movements, whereby a record may be repeated a predetermined number of times.

34. A phonograph comprising, a rotatable playing platform adapted to support a plurality of records, a platform motor for driving the same, a platform motor controlling switch, a movable arm carrying a reproducer and stylus cooperative with the grooves in the record and adapted to be moved thereby across the platform, an auxiliary motor, a normally open starting switch for the auxiliary motor, record-controlled switch closing means for starting said auxiliary motor upon the completion of the playing of a record, an auxiliary motor-operated circuit controlling means for opening the circuit of the auxiliary motor after a predetermined cycle has been carried out, a record magazine for records to be played, and a record shifting arm operated by the auxiliary motor during said cycle for shifting a record from the magazine to the playing platform and setting the reproducer in initial playing position according to the size of the record being transferred, the platform motor control switch being under the control of the record shifting arm and opened thereby in the absence of a record to be transferred, the reproducer carrying arm also being under the control of the record shifting arm in the absence of a record being transferred for setting the reproducer in a predetermined playing position.

35. A phonograph comprising, a rotatable playing platform adapted to support a plurality of records, a platform motor for driving the same, a platform motor controlling switch, a movable arm carrying a reproducer and stylus cooperative with the grooves in the record and adapted to be moved thereby across the platform, an auxiliary motor, a normally open starting switch for the auxiliary motor, record-controlled switch closing means for starting said auxiliary motor upon the completion of the playing of a record, an auxiliary motor-operated circuit controlling means for opening the circuit of the auxiliary motor after a predetermined cycle has been carried out, a record magazine for records to be played, a record shifting arm operated by the auxiliary motor during said cycle for shifting a record from the magazine to the playing platform, and means whereby the platform motor control switch may be actuated toward open position by the movement of the record shifting arm in the absence of a record, this switch being capable of being preset to require a predetermined number of such movements, whereby a record may be repeated a predetermined number of times or preset so that the switch is not so actuated, whereby the record may be repeated indefinitely.

36. A phonograph comprising, a rotatable playing platform adapted to support a plurality of records, a platform motor for driving the same, a platform motor controlling switch, a swinging arm carrying a reproducer and stylus cooperative with the grooves in the record and adapted to be moved thereby across the platform, an auxiliary motor, a normally open starting switch for the auxiliary motor, record-controlled switch closing means for starting said auxiliary motor upon the completion of the playing of a record, an auxiliary motor-operated circuit controlling means for opening the circuit of the auxiliary motor after a predetermined cycle has been carried out, a record magazine for records to be played, and a record shifting arm operated by the auxiliary motor during said cycle for shifting a record from the magazine to the playing platform, the edge of the record being shifted acting on the swinging arm to position the reproducer in accordance with the diameter of the record to be in the initial playing position of said record, the record shifting arm being engageable, in the absence of a record to shift, with the swinging arm to move it outwardly toward initial playing position.

37. A phonograph comprising, a rotatable playing platform adapted to support a plurality of records, a platform motor for driving the same, a platform motor controlling switch, a swinging arm carrying a reproducer and stylus cooperative with the grooves in the record and adapted to be moved thereby across the platform, an auxiliary motor, a normally open starting switch for the auxiliary motor, record-controlled switch closing means for starting said auxiliary motor upon the completion of the playing of a record, an auxiliary motor-operated circuit controlling means for opening the circuit of the auxiliary motor after a predetermined cycle has been carried out, a record magazine for records to be played, a record shifting arm operated by the auxiliary motor during said cycle for shifting a record from the magazine to the playing platform, the edge of the record being shifted acting on the swinging arm to position the reproducer in accordance with the diameter of the record to be in the initial playing position of said record, the record shifting arm being engageable, in the absence of a record to shift, with the swinging arm to move it outwardly toward initial playing position, and means operated by the auxiliary motor for thereafter setting the swinging arm in the initial position for a record of predetermined size.

38. A phonograph comprising, a rotatable playing platform adapted to support a plurality of records, a platform motor for driving the same, a platform motor controlling switch, a swinging arm carrying a reproducer and stylus cooperative with the grooves in the record and adapted to be moved thereby across the platform, an auxiliary motor, a normally open starting switch for the auxiliary motor, record-controlled switch closing means for starting said auxiliary motor upon the completion of the playing of a record, an auxiliary motor-operated circuit controlling means for opening the circuit of the auxiliary motor after a predetermined cycle has been carried out, a record magazine for records to be played, a record shifting arm operated by the auxiliary motor during said cycle for shifting a record from the magazine to the playing platform, the edge of the record being shifted acting on the swinging arm to position the reproducer in accordance with the diameter of the record to be in the initial playing position of said record, the record shifting arm being engageable, in the absence of a record to shift, with the swinging arm to move it outwardly toward initial playing position, and means whereby the platform motor control switch may be actuated toward open position by the movement of the record shifting arm in the absence of a record, this switch being capable of being preset to require one or a predetermined number of such movements or so that the switch is not actuated by the arm, whereby the platform motor may be stopped after the playing of the last record, or whereby the last record may be repeated from said position a predetermined number of times or indefinitely.

39. A phonograph comprising, a rotatable playing platform adapted to support a plurality of records about a center pin, a movable arm carrying a reproducer and stylus cooperative with the grooves in the record and adapted to be moved thereby across the platform, a motor, a normally open starting switch for the motor, record-controlled switch closing means for starting said motor upon the completion of the playing of a record, a motor-operated circuit controlling means for opening the circuit of the motor after a predetermined cycle has been carried out, a record magazine disposed to one side of the playing platform, stationary record guides, and automatic record changing mechanism operated by the motor for transferring the records one at a time from the magazine to the playing platform, the record being transferred being supported by the record guides until it is brought over the center pin, which then partially supports it, and then being shifted beyond the guides and supported on the center pin only.

40. A phonograph comprising, a rotatable playing platform adapted to support a plurality of records, an arm carrying a reproducer and stylus cooperative with the grooves in the record and adapted to be moved thereby across the platform, a motor, a normally open starting switch for the motor, record-controlled switch closing means for starting said motor upon the completion of the playing of a record, a motor-operated circuit controlling means for opening the circuit of the motor after a predetermined cycle has been carried out, a record magazine for records to be played, and automatic record changing mechanism operated by the motor for transferring the records one at a time from the magazine to the playing platform, the driving connections between the motor and record changing mechanism including a lost motion driving connection permitting the record changing mechanism to remain stationary during the over-run of the motor after the running switch has been opened.

41. A multiple record phonograph having an upwardly opening cabinet, a phonograph table placed across the upper part of the cabinet, a motor driven playing platform above the table, an upwardly opening magazine adjacent the top of the table for supporting a stack of records, the bottom of the magazine being at approximately the level of the playing platform and to one side thereof, record shifting mechanism acting on the upper record, and stationary upwardly inclined guides for supporting a record as it is being shifted from the magazine to the playing platform.

42. A multiple record phonograph having an upwardly opening cabinet, a phonograph table placed across the upper part of the cabinet, a motor driven playing platform above the table, an upwardly opening magazine adjacent the top of the table for supporting a stack of records, record shifting mechanism acting on the upper record, and upwardly inclined stationary guides for supporting a record as it is being shifted from the magazine to the playing platform, whereby the record being shifted is carried up an incline.

43. A multiple record phonograph having an upwardly opening cabinet, a phonograph table placed across the upper part of the cabinet, a motor driven playing platform above the table, an upwardly opening magazine adjacent the top of the table for supporting a stack of records, record shifting mechanism acting on the upper record, and stationary guides for supporting a record as it is being shifted from the magazine to the playing platform, the platform having a center pin to facilitate supporting the record during the latter part of its travel over the guides and to thereafter form the sole support for the record until the center hole in the record is brought directly over the center pin.

44. A multiple record phonograph having an upwardly opening cabinet, a phonograph table placed across the upper part of the cabinet, a motor driven playing platform above the table, an upwardly opening magazine adjacent the top of the table for supporting a stack of records, stationary record supporting guides extending from the magazine to adjacent the playing platform, and record shifting mechanism including a laterally shiftable, vertically movable, record shifting arm having its free end resting on the upper record while it is being moved from the magazine to deposit it on the playing platform.

45. A multiple record phonograph having an upwardly opening cabinet, a phonograph table placed across the upper part of the cabinet, a motor driven playing platform above the table, an upwardly opening magazine adjacent the top of the table for supporting a stack of records, stationary record supporting guides extending from the magazine to adjacent the playing platform, and record shifting mechanism including a laterally shiftable, vertically movable, record shifting arm having its free end resting on the upper record while it is being moved from the magazine to deposit it on the playing platform, the arm being cooperative with a stationary cam which supports its free end after the deposit of the record and holds the arm off a record on the playing platform.

46. A multiple record phonograph having an upwardly opening cabinet, a phonograph table placed across the upper part of the cabinet, a motor driven playing platform above the table, a swinging reproducer support carrying a reproducer cooperative with a record on the platform, an upwardly opening stationary magazine adjacent the top of the table for supporting a stack of records, a record shifting arm mounted concentrically with the reproducer support for shifting a record from the magazine to the playing platform, and operating mechanism for the record shifting arm concealed underneath the phonograph table.

47. A multiple record phonograph having an upwardly opening cabinet, a phonograph table placed across the upper part of the cabinet, a motor driven playing platform above the table, a swinging reproducer support carrying a reproducer cooperative with a record on the platform, an upwardly opening stationary magazine adjacent the top of the table for supporting a stack of records, automatic record changing mechanism automatically set into operation upon the completion of the playing of a record for carrying out a cycle of operations wherein the upper record is transferred from the magazine to the platform to be played thereon, and the reproducer is returned to initial playing position, said mechanism including a record shifting arm mounted concentrically with the reproducer support.

48. A multiple record phonograph having an upwardly opening cabinet, a phonograph table placed across the upper part of the cabinet, a motor driven playing platform above the table, a swinging reproducer support carrying a reproducer cooperative with a record on the platform, an upwardly opening stationary magazine adjacent the top of the table for supporting a stack of records, automatic record changing mechanism automatically set into operation upon the completion of the playing of a record for carrying out a cycle of operations wherein the upper record is transferred from the magazine to the platform to be played thereon, and the reproducer is returned to initial playing position, all of said mechanism being concealed except a record shifting arm which sweeps back and forth above the table, and about the same axis as the reproducer support.

49. A multiple record phonograph having an upwardly opening cabinet, a phonograph table placed across the upper part of the cabinet, a motor driven playing platform above the table, an upwardly opening magazine adjacent the top of the table for supporting a stack of records, a swinging tone arm carrying a reproducer and stylus cooperative with a record on the playing platform and connected to a tone arm support, an oscillatory ring mounted about the tone arm support underneath the table and about the same axis as the tone arm, and a record shifting arm mounted on said ring and extending above the table to sweep back and forth between the record magazine and playing platform.

50. A multiple record phonograph having an upwardly opening cabinet, a phonograph table placed across the upper part of the cabinet, a motor driven playing platform above the table, an upwardly opening magazine adjacent the top of the table for supporting a stack of records, record shifting mechanism acting on the upper record, stationary guides for supporting a record as it is being shifted from the magazine to the playing platform, and a selector switch for controlling the operation of the playing platform motor, said switch being capable of being manually preset in a plurality of positions in certain of which it is actuated toward open position when the record shifting mechanism functions in the absence of a record to shift.

51. In an automatic multiple record phonograph, a rotatable playing platform, a record magazine including a stationary record support disposed to one side of the playing platform and adapted to receive a stack of records, a reciprocatory record shifting arm whose free end carries a record engaging device, and means to move the arm successively from a position substantially to the rear of the center of the records in the magazine to carry it over the magazine into engagement with the uppermost record of the stack of varying height and bring the record engaging device over the center of the playing platform and then return it to the first position.

52. In an automatic multiple record phonograph, a rotatable playing platform, a record magazine disposed to one side of the playing platform and adapted to receive a stack of records, a reciprocatory record shifter having an arm mounted for vertical movement of its free end, said end carrying a record engaging device, means to bodily move the shifter and arm from a position substantially to the rear of the center of the records in the magazine to carry it over the magazine and bring the record engaging device over the center of the playing platform and then return the arm to the first position, and a stationary cam for maintaining the record engaging device in elevated position near the extreme positions, the record engaging device lowering under the influence of gravity to engage the records in the magazine.

53. A cabinet type automatic multiple record phonograph, having a phonograph table across the upper part of the cabinet, a table supported record magazine including a record support fixed against vertical movement with respect to the cabinet, a rotatable playing platform, the magazine being disposed to one side of the playing platform and adapted to receive a stack of records, a reciprocatory record shifting arm disposed above the table and carrying a record engaging device, and means carried underneath the table for moving the arm successively from a position substantially to the rear of the center of the records in the magazine to carry it over the magazine into engagement with the topmost record of the stack and bring the record engaging device over the center of the playing platform and then return it to the first position.

54. A cabinet type automatic multiple record phonograph, having a phonograph table across the upper part of the cabinet, a table supported record magazine, a rotatable playing platform, the magazine being disposed to one side of the playing platform and adapted to receive a stack of records, an oscillatory record shifting arm pivotally supported underneath the phonograph table and extending upwardly through an aperture in the table and having a free end above the table which carries a record engaging device, means to move the arm from a position substantially to the rear of the center of the records in the magazine to carry it over the magazine and bring the record engaging device over the center of the playing platform and then return it to the first position, and a self closing shutter normally closing the aperture in the table and opened by the arm when shifted away from the first position.

55. In an automatic multiple record phonograph, a rotatable playing platform, a record magazine disposed to one side of the playing platform and adapted to receive a stack of records, an oscillatory record shifting arm whose free end carries a record engaging device, means to move the arm from a position substantially to the rear of the center of the records in the magazine to carry it over the magazine and bring the record engaging device over the center of the playing platform and then return it to the first position, and a housing above the record magazine and disposed behind the record magazine in which the arm is disposed when in said first position.

56. In an automatic multiple record phonograph, a rotatable playing platform, a record magazine disposed to one side of the playing platform and adapted to receive a repertoire of variously sized records stacked on top of one another in indeterminate relation, the magazine having a configuration to limit lateral movement of the records in one direction whereby the center hole of a record may then be in a predetermined position dependent upon the size of the record and its position in the stack, a reciprocatory record shifting arm, means to move the arm from a position substantially to the rear of the center of the records in the magazine to carry it over the magazine and bring the free end of the record shifting arm over the center of the playing platform and then return the arm to the first position, said record shifting arm having a record engaging device to move the upper record to said predetermined position during the return movement of the arm, and a pick up device to engage the center hole of said record on the next movement of the arm to shift the record to the playing platform, the operating means for the arm including a rotary driving member, and a connecting rod for actuating the record shifting arm.

57. In a multiple record phonograph, a playing platform, a record magazine for a stacked repertoire of records of different sizes to be played therefrom in succession, record shifting mechanism, said magazine being in the form of an upwardly opening receptacle to receive the stack of records and being placed to one side of the playing platform and having a bottom extending to side walls at the more remote part of the magazine, the side walls limiting the movement of the records across the bottom, and record supporting guides opposite one another and having upwardly inclined portions to receive the record when shifted from the receptacle toward the playing platform, said guides converging inwardly to support records of various sizes, at least one of the guides having a flat horizontal record supporting portion beyond the inclined portion and adjacent the playing platform.

58. In a multiple record phonograph, a playing platform having an upwardly extending center pin, a record magazine for a stacked repertoire of records of different sizes to be played therefrom in succession, record shifting mechanism, said magazine being in the form of an upwardly opening receptacle to receive the stack of records and being placed to one side of the playing platform and having a bottom extending to side walls at the more remote part of the magazine, the side walls limiting the movement of the records across the bottom, and record supporting guides opposite one another and having upwardly inclined portions to receive the record when shifted from the receptacle toward the playing platform, said guides converging inwardly to support records of various sizes and permit sliding either size record upwardly to bring it above the center pin whereupon it is supported by the guides and center pin, at least one of the guides having a flat horizontal record supporting portion beyond the inclined portion and adjacent the playing platform, said horizontal portion diverging from the other guide to permit either size record to be deposited in the platform when its center hole is brought over the center pin.

59. In a multiple record phonograph, a playing platform, a record magazine for a stacked repertoire of records of different sizes to be played therefrom in succession, record shifting mechanism including a reciprocable record shifting arm mounted for vertical movement and provided at its end with a record pick up pin, said magazine being in the form of an upwardly opening receptacle to receive the stack of records and being placed to one side of the playing platform and having a bottom extending to side walls at the more remote part of the magazine, the side walls limiting the movement of the records across the bottom, said side walls having a configuration to then locate the center holes of records of either size in the path of the record pick up pin, and record supporting guides opposite one another and having upwardly inclined portions to receive the record when shifted from the receptacle toward the playing platform and elevate the record to be higher than the playing platform.

60. In a multiple record phonograph, a playing platform, a record magazine for a stacked repertoire of records of different sizes to be played therefrom in succession, record shifting mechanism including a swinging record shifting arm jointed to move about a horizontal axis and provided with a record pick up pin, said magazine being in the form of an upwardly opening receptacle to receive the stack of records and being placed to one side of the playing platform and having a bottom extending to side walls at the more remote part of the magazine, the side walls limiting the movement of the records across the bottom, said side walls having a configuration to then locate the center holes of records of either size in the path of the record pick up pin, and record supporting guides opposite one another and having upwardly inclined portions to receive the record when shifted from the receptacle toward the playing platform and elevate the record to be higher than the playing platform, said guides being spaced to support records of various sizes, at least one of the guides having a flat horizontal record supporting portion beyond the inclined portion and adjacent the playing platform.

61. A multiple record phonograph having a swinging reproducer support, a rotatable playing platform for supporting records to be played by the reproducer, a record magazine placed to one side of the playing platform and adapted to receive a stack of records, and an oscillatory record shifting arm swinging about the same axis as the reproducer support for shifting a record from the magazine to the playing platform.

62. A multiple record phonograph having a movable reproducer support, a rotatable playing platform for supporting records to be played by the reproducer, a record magazine placed to one side of the playing platform and adapted to receive a stack of records, a record shifting arm for shifting a record from the magazine to the playing platform, and record engageable means movable with the reproducer for normally positioning the reproducer support in initial playing position in accordance with the diameter of the record being shifted to the playing platform, said means engaging the top of the record and acting to retain the record horizontal just prior to its deposit on the playing platform.

63. A multiple record phonograph having a movable reproducer support, a rotatable playing platform for supporting records to be played by the reproducer, a record magazine placed to one side of the playing platform and adapted to receive a stack of records, a record shifting arm for shifting a record from the magazine to the playing platform, and means for normally positioning the reproducer support in initial playing position in accordance with the diameter of the record being shifted to the playing platform, the record shifting arm, in the absence of a record to be shifted acting on the reproduced support to position it in an intermediate playing position.

64. A multiple record phonograph having a movable reproducer support, a rotatable playing platform for supporting records to be played by the reproducer, a record magazine placed to one side of the playing platform and adapted to receive a stack of records, a record shifting arm for shifting a record from the magazine to the playing platform, the record shifting arm being movable in vertical directions, guides over which the record slides in being shifted to the playing platform, and a phonograph control switch which is then unaffected by the shifting arm, the shifting arm becoming cooperatively associated with the switch to actuate the same in the absence of a record to shift.

65. A multiple record phonograph having a movable reproducer support, a rotatable playing platform for supporting records to be played by the reproducer, a record magazine placed to one side of the playing platform and adapted to receive a stack of records, a record shifting arm for shifting a record from the magazine to the playing platform, and lost motion driving connections for the record shifting arm to insure a substantial period of rest over the center of the playing platform during which the record is deposited on the platform.

66. A multiple record phonograph having a swinging reproducer support, a rotatable playing platform for supporting records to be played by the reproducer, a record magazine placed to one side of the playing platform and adapted to receive a stack of records, an oscillatory record shifting arm swinging about the same axis as the reproducer support for shifting a record from the magazine to the playing platform, and guides extending from the magazine to above the platform for guiding the records being shifted to the platform, the guide adjacent the axis being short and comparatively steep, the other guide being longer and of more gentle slope and having a horizontal portion, the two guides during the latter part of the movement of the record holding the record horizontal.

67. A multiple record phonograph having a swinging reproducer support, a rotatable playing platform for supporting records to be played by the reproducer, a record magazine placed to one side of the playing platform and adapted to receive a stack of records, an oscillatory record shifting arm swinging about the same axis as the reproducer support for shifting a record from the magazine to the playing platform, guides extending from the magazine to above the platform for guiding the records being shifted to the platform, the guide adjacent the axis being short and comparatively steep, the other guide being longer and of more gentle slope and having a horizontal portion, the two guides during the latter part of the movement of the record holding the record horizontal, the two guides also converging inwardly to support records of different sizes.

68. A multiple record phonograph having a movable reproducer support, a rotatable playing platform for supporting records to be played by the reproducer, a record magazine placed to one side of the playing platform and adapted to receive a stack of records, a record shifting arm for shifting a record from the magazine to the playing platform, and guides opposite one another for receiving a record being transferred and guiding the record to be above the playing platform, the platform having a center pin at substantially the elevation of the guides over which the movable arm shifts the record.

69. A multiple record phonograph having a movable reproducer support, a rotatable playing platform for supporting records to be played by the reproducer, a record magazine placed to one side of the playing platform and adapted to receive a stack of records, an oscillatory record shifting arm swinging about the same axis as the reproducer support for shifting a record from the magazine to the playing platform, the record shifting arm being also pivoted on a horizontal axis, guides over which the record slides in being shifted to the playing platform, and stationary cam means acting on the record shifting arm to support it when above the playing platform and prevent its engagement with a record on the platform.

70. A multiple record phonograph having a movable reproducer support, a rotatable playing platform for supporting records to be played by the reproducer, a record magazine placed to one side of the playing platform and adapted to receive a stack of records, an oscillatory record shifting arm swinging about the same axis as the reproducer support for shifting a record from the magazine to the playing platform, the record shifting arm being also pivoted on a horizontal axis, guides over which the record slides in being shifted to the playing platform, and stationary cam means acting on the record shifting arm to raise it away from the records in the magazine after it has passed beyond the center of the magazine.

71. In a multiple record phonograph, a record magazine for a repertoire of records to be played from a stack in succession, said magazine being in the form of an upwardly opening receptacle to receive the stack of records, and having a sloping bottom and side walls about the lower portions of the sloping bottom to limit the movement of the records downwardly across the sloping bottom and being free of obstructions about the upper portion of the sloping bottom whereby records may be removed laterally.

72. In a multiple record phonograph, a record magazine for a repertoire of records to be played from a stack in succession, said magazine being in the form of an upwardly opening receptacle to receive the stack of records, and having a bottom and side walls to limit the movement of the records across the bottom, said side walls being at acute angles to the bottom and engageable with the peripheries of records of the same size to place the center holes in said records offset from one another but in substantially vertical relation, said bottoms being free of obstructions about the portion opposite the side walls whereby records may be removed laterally.

73. In a multiple record phonograph, a record magazine for a repertoire of records to be played from a stack in succession, said magazine being in the form of an upwardly opening receptacle to receive the stack of records, and having a sloping bottom and side walls about the lower portions of the sloping bottom to limit the movement of the records downwardly across the sloping bottom, the angle of slope being insufficient to permit the records in the stack to freely slide relative to one another under the influence of gravity.

74. In a multiple record phonograph, a record magazine for a repertoire of records of different sizes to be played from a stack in succession, said magazine being in the form of an upwardly opening receptacle to receive the stack of records, and having a bottom and side walls to engage with the peripheries of the larger size records and at acute angles relative to the said bottom whereby the centers of such large sized records are slightly offset from one another but in substantially vertical relation, said side walls being also so shaped as to engage the peripheries of the smaller sized records at two widely separated points to locate the centers thereof in predetermined position relative to the position of the record centers of the larger sized records.

75. In a multiple record phonograph, a record magazine for a repertoire of records to be played from a stack in succession, said magazine being in the form of an upwardly opening receptacle to receive the stack of records, and having a bottom and side walls at one side of the bottom to limit the movement of the records across the bottom, and upwardly inclined supporting guides at the other side of the receptacle and opposite one another to receive a record when moved laterally away from the side walls of the receptacle.

76. In a multiple record phonograph, a record magazine for a repertoire of records to be played from a stack in succession, said magazine being in the form of an upwardly opening receptacle to receive the stack of records, and having a bottom and side walls at one side of the bottom to limit the movement of the records across the bottom, and upwardly inclined supporting guides at the other side of the receptacle and opposite one another to receive a record when moved laterally away from the side walls of the receptacle, said guides converging inwardly to support records of various sizes.

77. In a multiple record phonograph, a record magazine for a repertoire of records to be played from a stack in succession, said magazine being in the form of an upwardly opening receptacle to receive the stack of records, and having a bottom and side walls at one side of the bottom to limit the movement of the records across the bottom, upwardly inclined supporting guides at the other side of the receptacle and opposite one another to receive a record when moved laterally away from the side walls of the receptacle, and a flat horizontal record supporting guide beyond one of the inclined guides.

78. In a multiple record phonograph, in combination, a record magazine, and an oscillatory record shifting arm mounted to swing bodily about a vertical axis and having its free end pivoted to move about a horizontal axis and provided with a record engaging finger for moving a record away from the magazine, said magazine having a bottom free of obstructions and adapted to support a stack of records in indeterminate relation, said magazine also having oblique side walls engageable with the peripheries of records of a certain size to dispose the center holes of each of said records, when so engaged, in offset relation and in the path of the record engaging finger when swinging in a direction to remove a record.

79. In a multiple record phonograph, in combination, a record magazine, and an oscillatory record shifting arm mounted to swing bodily about a vertical axis and having its free end pivoted to move about a horizontal axis and provided with a record engaging finger for moving a record away from the magazine, said magazine having a bottom free of obstructions and adapted to support a stack of records in indeterminate relation, said magazine also having oblique side walls engageable with the peripheries of records of a certain size to dispose the center holes of each of said records, when so engaged, in offset relation and in the path of the record engaging finger when swinging in a direction to remove a record, said side walls being also engageable with the peripheries of records of a predetermined smaller size to similarly dispose the center holes thereof.

80. In a multiple record phonograph, in combination, a record magazine, and an oscillatory record shifting arm mounted to swing bodily about a vertical axis and having its free end pivoted to move about a horizontal axis and provided with a record engaging finger for moving a record away from the magazine, said magazine having a bottom free of obstructions and adapted to support a stack of records in indeterminate relation, said magazine also having oblique side walls engageable with the peripheries of records of a certain size to dispose the center holes of each of said records, when so engaged, in off set relation and in the path of the record engaging finger when swinging in a direction to remove a record, the free end of said arm having a record pusher engageable with the topmost record in the stack when moving in the opposite direction to push that record against said side walls.

81. In a multiple record phonograph, in combination, a record magazine, and an oscillatory record shifting arm mounted to swing bodily about a vertical axis and having its free end pivoted to move about a horizontal axis and provided with a record pusher engageable with the topmost record in the stack, said magazine having a bottom and side walls about a portion of the bottom, said side walls being engageable with the peripheries of records of predetermined sizes at widely spaced points on opposite sides of the perpendicular to the line connecting the center of such record and the center about which the arm swings, the record pusher acting to so place the records when moving in one direction, and means to lift the arm off the record after the pusher passes by the center of the record.

82. In a multiple record phonograph, in combination a record magazine, a movable record shifting arm having a record shifting pin, and means to move the arm back and forth over the record magazine, the magazine having a bottom and side walls about a portion of the bottom, said side walls being engageable with the peripheries of records of predetermined sizes at equally spaced points on opposite sides of the path of movement of the record shifting pin so that said pin may enter the hole in the center of the record.

83. In a record shifting mechanism for multiple record phonographs, an oscillatory operating member mounted on a vertical axis, a record shifting arm operably connected thereto for bodily movement therewith and jointed to move about a horizontal axis, and means whereby the record shifting arm is caused to traverse one path when shifting a record and a different path when actuated by the operating member without shifting a record.

84. In a record shifting mechanism for multiple record phonographs, an oscillatory operating member mounted on a vertical axis, and a record shifting arm operably connected thereto for bodily movement therewith and jointed to move about a horizontal axis, the free end of the arm having a record shifting pin engageable with the center hole of a record when moving in one direction and a record pusher engageable with the surface of a record when moving in the other direction.

85. In a record shifting mechanism for multiple record phonographs, an oscillatory operating member mounted on a vertical axis, and a record shifting arm operably connected thereto for bodily movement therewith and jointed to move about a horizontal axis, the free end of the arm having a record pusher having an oblique under surface engageable with the upper record of a stack to facilitate raising the arm up onto a stack of records.

86. In a record shifting mechanism for multiple record phonographs, an oscillatory operating member mounted on a vertical axis, a record shifting arm mounted thereon for bodily movement therewith and jointed to move about a horizontal axis, and stationary cam means to limit the downward movement of the arm at certain portions of its travel.

87. In a multiple record phonograph, a record magazine, a rotatable playing platform, a movable support carrying a reproducer and stylus cooperative with a record on the playing platform, automatic record change mechanism for effecting a transfer of a record from the magazine to the playing platform, means under the control of said record change mechanism for lifting the stylus off the record, and means also under the control of the record change mechanism for bodily shifting the reproducer and stylus inwardly during the cycle of transferring of a record to place them adjacent the center of the playing platform to meet an oncoming record.

88. In a multiple record phonograph, a record magazine, a rotatable playing platform, a movable support carrying a reproducer and stylus cooperative with a record on the playing platform, automatic record change mechanism for effecting a transfer of a record from the magazine to the playing platform, means under the control of said record change mechanism for lifting the stylus off the record, and means also under the control of the record change mechanism for bodily shifting the reproducer and stylus inwardly during the cycle of transferring of a record to place them adjacent the center of the playing platform to meet an oncoming record, said last mentioned means comprising a member moving with the reproducer support, and a member moving with the record change mechanism.

89. In a multiple record phonograph, a record magazine, a rotatable playing platform, a movable support carrying a reproducer and stylus cooperative with a record on the playing platform, automatic record change mechanism for effecting a transfer of a record from the magazine to the playing platform, means under the control of said record change mechanism for lifting the stylus off the record, and means also under the control of the record change mechanism for bodily shifting the reproducer and stylus inwardly to place them adjacent the center of the playing platform to meet an oncoming record, said last mentioned means then passing out of controlling relation with the reproducer support whereby the reproducer may be moved back to initial playing position without interference.

90. In a multiple record phonograph, a record magazine, a rotatable playing platform, a movable support carrying a reproducer and stylus cooperative with a record on the playing platform, automatic record change mechanism for effecting a transfer of a record from the magazine to the playing platform, means under the control of said record change mechanism for lifting the stylus off the record, means also under the control of the record change mechanism for bodily shifting the reproducer and stylus inwardly to place them adjacent the center of the playing platform to meet an oncoming record, said last mentioned means then passing out of controlling relation with the reproducer support whereby the reproducer may be moved back to initial playing position without interference, and a check to prevent free movement of the reproducer support when said last mentioned means operates.

91. In a multiple record phonograph, a record magazine, a rotatable playing platform, a movable support carrying a reproducer and stylus cooperative with a record on the playing platform, automatic record change mechanism for effecting a transfer of a record from the magazine to the playing platform, means under the control of said record change mechanism for lifting the stylus off the record, means also under the control of the record change mechanism for bodily shifting the reproducer and stylus inwardly to place them adjacent the center of the playing platform to meet an oncoming record, a friction plate movable with the reproducer support and a cooperative friction device engageable with the plate during said inward movement to check free movement.

92. In a multiple record phonograph, a record magazine, a rotatable playing platform, a movable support carrying a reproducer and stylus cooperative with a record thereon, automatic record change mechanism having a cycle of operation whereby a record is transferred from the magazine to the playing platform to be played thereon, a member carried by the reproducer support and in the path of a second member moving with the record change mechanism for shifting the reproducer toward the center of the platform during an early part of the cycle, the second member passing beyond the first member to permit the reproducer to be returned to initial playing position.

93. A multiple record phonograph having a playing platform, a record magazine to one side of the playing platform, a horizontally swinging record shifting member jointed so that its free end rests on the record being shifted, and cooperative stationary members for effecting a transfer of a record from the magazine to the platform, said members terminating adjacent the playing platform and at a higher elevation than the playing platform and being so interrelated that the record is underneath the shifting member and resting under the influence of gravity on the stationary members throughout the transfer and until it drops free of said supporting members onto the playing platform.

94. A multiple record phonograph having a playing platform, a record magazine to one side of the playing platform, a movable record shifting member, and cooperative stationary members for effecting a transfer of a record from the magazine to the platform, said members being so interrelated that the record is underneath the shifting member and resting under the influence of gravity on the stationary members throughout the transfer, said stationary members having summits in the same horizontal plane and adjacent the playing platform and including a center pin carried by the platform.

95. A multiple record phonograph having a playing platform, a record magazine to one side of the playing platform, a movable record shifting member, and cooperative stationary members for effecting a transfer of a record from the magazine to the platform, said members being so interrelated that the record is underneath the shifting member and resting under the influence of gravity on the stationary members throughout the transfer, said stationary members including upwardly inclined guides along which the record is shifted to bring it from a lower elevation to an elevation higher than the platform.

96. In a multiple record phonograph, a record magazine, a rotatable playing platform having a center pin, and stationary record supporting guides extending away from the magazine and terminating on opposite sides of the playing platform at substantially the elevation of the center pin whereby a record may be slid from the magazine over the guides and onto the pin so as to be supported on the pin and guides, and deposited on the playing platform when moved beyond the guides to bring the center hole above the center pin.

97. In a multiple record phonograph, a record magazine, a playing platform having a center pin, a stationary record supporting guides extending away from the magazine and terminating on opposite sides of the playing platform at substantially the elevation of the center pin, and a movable reproducer support carrying a record engaging device at about the elevation of the center pin, the device being engageable with the advancing edge of a record as it is slid along the guides to pass over the pin.

98. A multiple record phonograph having stationary record supporting guides, and a playing platform located between the terminal portions of the guides and at a lower elevation than said terminal portions, the platform having a center pin whose upper end is at the elevation of these portions of the guides, whereby a record may be supported in a horizontal position on the guides and center pin.

99. A multiple record phonograph having stationary record supporting guides, and a playing platform located between the terminal portions of the guides and at a lower elevation than said terminal portions, the platform having a center pin whose upper end is at the elevation of these portions of the guides, whereby a record may be supported in a horizontal position on the guides and center pin, a record shifting arm resting on top of a record on the guides and engageable with the center hole of the record, the arm being adapted to slide the record along the guides and move the center hole of the record above the center pin on the playing platform to deposit the record on the platform, and means for preventing tilting the record after it leaves the guides.

100. A multiple record phonograph having stationary record supporting guides, a playing platform located between the terminal portions of the guides and at a lower elevation than said terminal portions, the platform having a center pin whose upper end is at the elevation of these portions of the guides, whereby a record may be supported in a horizontal position on the guides and center pin with its center hole between the three points of support, a record shifting arm resting on top of the record and engageable with the center hole and adapted to slide the record clear of the guides where it is supported solely by the center pin, and means engageable with the record for preventing tilting of the record when so supported, said means permitting the record to drop onto the playing platform when the center hole of the record is brought over the pin.

101. A multiple record phonograph comprising a playing platform having a center pin and adapted to support a plurality of records, a movable reproducer support carrying a reproducer and stylus cooperative with a record on the playing platform, the reproducer support being disposed to one side of the center pin, a record magazine, record supporting guides extending from the magazine toward the playing platform and terminating at the elevation of the center pin in such position that a record may slide along the guides over the center pin to be supported by the guides and pin.

102. A multiple record phonograph comprising a playing platform having a center pin and adapted to support a plurality of records, a movable reproducer support carrying a reproducer and stylus cooperative with a record on the playing platform, the reproducer support being disposed to one side of the center pin, a record magazine, record supporting guides extending from the magazine toward the playing platform and terminating at the elevation of the center pin in such position that a record may slide along the guides over the center pin to be supported by the guides and pin, a reciprocatory record shifting arm having a vertically movable free end provided with a device engageable with the center hole of the upper record in the magazine to shift said record along the guides over the center pin, the free end of the record shifting arm being supported by the record being shifted, the arm being capable of shifting the record beyond the stationary guides to bring the center hole over the pin, the record being supported solely by the center pin, and means for preventing tilting of the record.

103. A multiple record phonograph comprising a playing platform having a center pin and adapted to support a plurality of records, a movable reproducer support carrying a reproducer and stylus cooperative with a record on the playing platform, the reproducer support also carrying a record engaging device disposed to one side of the center pin and at about the elevation of the center pin, a record magazine, record supporting guides extending from the magazine toward the playing platform and terminating at the elevation of the center pin in such position that a record may slide along the guides over the center pin to be supported by the guides and pin and then brought underneath the record engaging device carried by the reproducer support, and a reciprocatory record shifting arm engageable with the center hole of the upper record in the magazine to shift said record along the guides over the center pin and against the record engaging device, the free end of the record shifting arm being supported by the record being shifted.

104. A multiple record phonograph comprising a playing platform having a center pin and adapted to support a plurality of records, a movable reproducer support carrying a reproducer and stylus cooperative with a record on the playing platform, the reproducer support also carrying a record engaging device disposed to one side of the center pin and at about the elevation of the center pin, a record magazine, record supporting guides extending from the magazine toward the playing platform and terminating at the elevation of the center pin in such position that a record may slide along the guides over the center pin to be supported by the guides and pin and then brought underneath the record engaging device carried by the reproducer support, and a reciprocatory record shifting arm having a vertically movable free end provided with a device engageable with the center hole of the upper record in the magazine to shift said record along the guides over the center pin and against the record engaging device, the free end of the record shifting arm being supported by the record being shifted, the arm being capable of shifting the record beyond the stationary guides to bring the center hole over the pin, the record when beyond the guides being supported solely by the center pin, and prevented from tilting by the record engaging device.

105. A multiple record phonograph comprising a playing platform having a center pin and adapted to support a plurality of records, a movable reproducer support carrying a reproducer and stylus cooperative with a record on the playing platform, the reproducer support also carrying a record engaging device disposed to one side of the center pin and at about the elevation of the center pin, a record magazine, record supporting guides extending from the magazine toward the playing platform and terminating at the elevation of the center pin in such position that a record may slide along the guides over the center pin to be supported by the guides and pin and then brought underneath the record engaging device carried by the reproducer support, and a reciprocatory record shifting arm having a vertically movable free end provided with a device engageable with the center hole of the upper record in the magazine to shift said record along the guides over the center pin and against the record engaging device, the free end of the record shifting arm being supported by the record being shifted, the arm being capable of shifting the record beyond the stationary guides to bring the center hole over the pin, the record, when beyond the guides, being supported solely by the center pin, and prevented from tilting by the record engaging device, the record engaging device being movable with the record to move the reproducer support to a point determined by the diameter of the record, whereby the reproducer may be located in initial playing position for the record.

106. A phonograph having means for successively playing on a single playing platform a repertoire of various sized records placed in a storage magazine, said means including mechanism for shifting each record from the magazine to a point where it is supported solely by the center pin of the playing platform, and a dually functioning device which prevents tilting of the record when so supported and until it is deposited on the playing platform and presets the reproducer in initial playing position for each record in accordance with the diameter of the record.

107. In a multiple record phonograph wherein each record is transferred from a magazine to a point where it is supported solely by the center pin of a playing platform, a reproducer presetting means engageable with the record being shifted for setting the reproducer in accordance with the diameter of the record being transferred and for preventing tilting of that record while supported on the center pin and until it is deposited on the playing platform.

108. A phonograph having a movable reproducer, a storage magazine, a playing platform having a center pin, stationary guides between the magazine and platform and terminating at an elevation above the platform, automatic record changing mechanism whereby a repertoire of records placed in the storage magazine may be played in succession, said mechanism including a record shifting device for laterally shifting a record over said guides to bring it above the playing platform whereupon it may drop down along the center pin to be deposited thereon, and a record engaging device movable laterally with the reproducer and in the path of the oncoming record, the device being movable sidewise by the record until the record is deposited on the platform.

109. A phonograph having a movable reproducer, a storage magazine, a playing platform having a center pin, stationary guides between the magazine and platform and terminating at an elevation above the platform, automatic record changing mechanism whereby a repertoire of records placed in the storage magazine may be played in succession, said mechanism including a record shifting device for laterally shifting a record over said guides to bring it above the playing platform whereupon it may drop down along the center pin to be deposited thereon, and a record engaging device operated by said mechanism to be placed near the center pin in the path of the oncoming record, and a friction check to hold the record engaging device in this position until engaged by the record, the record engaging device being movable sidewise by the record until it is deposited on the platform.

110. In a multiple record phonograph wherein each record is transferred from a magazine to a point where it is supported solely by the center pin of a playing platform, a reproducer presetting means engageable with the record being shifted for setting the reproducer in accordance with the diameter of the record being transferred and for preventing tilting of that record while supported on the center pin and until it is deposited on the playing platform, and means for moving the reproducer presetting means inwardly toward the center of the platform to meet a record being transferred, the reproduced presetting means being moved back by the record.

111. In a multiple record phonograph wherein each record is transferred from a magazine to a point where it is supported solely by the center pin of a playing platform, a reproducer presetting means engageable with the record being shifted for setting the reproducer in accordance with the diameter of the record being transferred and for preventing tilting of that record while supported on the center pin and until it is deposited on the playing platform, means for moving the reproducer presetting means inwardly toward the center of the platform to meet a record being transferred, the reproducer presetting means being moved back by the record, and a friction check to hold the reproducer presetting means in said inner position and offer resistance to the movement thereof by the record.

112. In a multiple record phonograph wherein each record is transferred from a magazine to a point where it is supported solely by the center pin of a playing platform, a reproducer presetting means engageable with the record being shifted for setting the reproducer in accordance with the diameter of the record being transferred and for preventing tilting of that record while supported on the center pin and until it is deposited on the playing platform, and means for checking the reproducer presetting means in the position to which it becomes set by the transfer of a record of a predetermined size.

113. In a multiple record phonograph, a record magazine, a rotatable playing platform, a movable support carrying a reproducer and stylus cooperative with a record on the playing platform, automatic record change mechanism for effecting a transfer of a record from the magazine to the playing platform, means under the control of said record change mechanism for lifting the stylus off the record, means also under the control of the record change mechanism for bodily shifting the reproducer and stylus inwardly to place them adjacent the center of the playing platform to meet an oncoming record, and a friction check to yieldably hold the reproducer support in said position.

114. In a phonograph, the combination with a rotatable playing platform adapted to support a plurality of records, and a movable reproducer and stylus cooperative with the grooves in the record and adapted to be moved thereby across the platform, of a record magazine for records of various sizes, and automatic record changing mechanism automatically set into operation upon the completion of the playing of a record to carry out a predetermined cycle of operations, including raising the stylus off the record after it has been played and returning it to the succeeding record, said record changing mechanism including means for bringing the edge of the record being transferred against a member moving with the reproducer to move the stylus to an initial playing position for each record in accordance with the diameter of said record, means for maintaining it in such position until the stylus is lowered, and means for imparting lateral movement to the reproducer to bring the stylus into engagement with the sound grooves.

115. In a phonograph, the combination with a rotatable playing platform adapted to support a plurality of records, and a movable reproducer and stylus cooperative with the grooves in the record and adapted to be moved thereby across the platform, of a record magazine for records of various sizes, and automatic record changing mechanism automatically set into operation upon the completion of the playing of a record to carry out a predetermined cycle of operations, said record changing mechanism including means for bringing the edge of the record being transferred against a member moving with the reproducer to move the stylus above an initial playing position for each record in accordance with the diameter of said record, and devices for holding the reproducer in the position to which it has been shifted, until the stylus is to be returned to playing position, said last mentioned devices acting to move the stylus laterally toward the playing surface of the record after the stylus is placed on the record.

116. A multiple record phonograph having reproducer presetting means under the control of a record about to be played for locating the stylus on the upper surface of said record adjacent the outer edge thereof and auxiliary reproducer presetting means functioning upon the repeat playing of a record for locating the stylus at a predetermined point irrespective of the size of the record being repeated.

117. A phonograph having a continuously rotating playing platform, a movable reproducer and stylus, a magazine, record shifting mechanism for shifting records from the magazine to the playing platform, mechanism for raising the reproducer and stylus off a record on the platform and for lowering it onto the record shifted onto the platform, means under the control of the record being shifted to locate the reproducer and stylus in such position that the stylus is brought onto the upper surface of the latter mentioned record adjacent its periphery, and means independent of the record for thereafter imparting a rapid lateral movement to the reproducer and stylus to shift the stylus toward the playing surface of the record.

118. A phonograph having a playing platform, a movable reproducer and stylus, mechanism for raising the reproducer and stylus off a record on the platform and for lowering it onto a record on the platform, means to locate the reproducer and stylus in such position that the stylus is brought onto the upper surface of the record adjacent its periphery, and means for thereafter imparting lateral movement to the reproducer and stylus to shift the stylus toward the playing surface of the record, said means including a spring having one end connected to the reproducer support and means engageable with the other end to hold the spring so distorted until after the stylus is placed on the record that it shifts the reproducer and stylus.

119. A phonograph having a playing platform, a movable reproducer and stylus, mechanism for raising the reproducer and stylus off a record on the platform and for lowering it onto a record on the platform, means to locate the reproducer and stylus in such position that the stylus is brought onto the upper surface of the record adjacent its periphery, a spring bodily movable with the reproducer support, a plate having a notch engageable with the end of the spring when the reproducer is located in said position, and means to move the plate away from the spring after the stylus is placed on the record, the expansion of the spring acting to shift the stylus toward the playing surface.

120. A multiple record phonograph having a playing platform driven by a platform motor, a record magazine, a record transfer mechanism for shifting records one at a time from the magazine to the playing platform, an auxiliary motor for operating the record transfer mechanism, a manually controlled main switch in the circuit of the platform motor, a normally open record controlled starting switch for the auxiliary motor, an auxiliary motor-operated circuit controlling means for opening the circuit of the auxiliary motor after a cycle has been completed, and means associated with the record shifting mechanism and main switch and acting in response to the functioning of the record shifting mechanism in the absence of a record to shift for effecting an opening of the main switch, whereby both motors are stopped.

121. A multiple record phonograph having a playing platform driven by a platform motor, a record magazine, a record transfer mechanism for shifting records one at a time from the magazine to the playing platform, an auxiliary motor for operating the record transfer mechanism, a manually controlled main switch in the circuit of both motors, a normally open record controlled starting switch for the auxiliary motor, a normally open motor running switch closed by the auxiliary motor and opened thereby after a cycle has been completed, means associated with the record shifting mechanism and main switch and acting in response to the functioning of the record shifting mechanism in the absence of a record to shift for effecting an opening of the main switch, whereby both motors are stopped, and an auxiliary circuit for supplying current to the auxiliary motor after the main switch has been opened until the motor running switch opens the circuit.

122. A multiple record phonograph having a playing platform driven by a platform motor, a record magazine, a record transfer mechanism for shifting records one at a time from the magazine to the playing platform, an auxiliary motor for operating the record transfer mechanism, a manually controlled main switch in the circuit of both motors, a normally open record controlled starting switch for the auxiliary motor, a normally open motor running switch closed by the auxiliary motor and opened thereby after a cycle has been completed, means associated with the record shifting mechanism and main switch and acting in response to the functioning of the record shifting mechanism in the absence of a record to shift for effecting an opening of the main switch, whereby both motors are stopped, and an auxiliary circuit for supplying current to the auxiliary motor after the main switch has been opened until the motor running switch opens the circuit, said main switch being capable of being preset to require a predetermined number of such idle operations of the record transfer mechanism.

123. A multiple record phonograph having a playing platform, a record magazine, an oscillatory record shifting arm mounted on a vertical axis to the rear of and between the platform and magazine and adapted to swing out from behind the magazine above the magazine and over to the center of the platform and to then return, the arm shifting a record from the magazine to the platform, and a housing above and to the rear of the magazine to receive the arm when in one extreme position.

124. A multiple record phonograph having a playing platform, a record magazine, an oscillatory record shifting arm mounted on a vertical axis to the rear of and between the platform and magazine and adapted to swing forwardly from behind the magazine center, above the magazine and over to the center of the platform and to then return, the arm shifting a record from the magazine to the platform, said arm being horizontally jointed, and a stationary cam to lift the free end of the arm up clear of the magazine.

125. In a multiple record phonograph, a playing platform, a phonograph table provided with a record receiving magazine, an oscillatory operating member mounted on a vertical axis to the rear of the magazine and platform and extending through the table, a record shifting arm disposed above the table and having its inner end connected to the operating member, the arm being adapted to swing over the magazine and to the center of the platform to shift a record to the platform, and a cam to support the hinged arm when over the platform and when behind the magazine center.

126. In a multiple record phonograph, a swinging reproducer support, a reproducer and stylus bodily carried by the reproducer support and cooperative with a record on a playing platform, and means to lift the stylus off the record including an oscillatory cam mounted concentric with the reproducer support, and a reproducer-lifting follower.

127. In a multiple record phonograph, a swinging reproducer support, a reproducer and stylus bodily carried by the reproducer support and cooperative with a record on a playing platform, means to lift the stylus off the record including an oscillatory cam mounted concentric with the reproducer support, and a reproducer-lifting follower, and record transfer mechanism for moving a record laterally onto the platform while the reproducer and stylus are above the platform.

128. A multiple record phonograph provided with a record storage area in which records are placed in an irregular stack, a playing area, means for transporting the top record in such storage area from a predetermined position therein to the playing area, and means for returning the record transport in a path to adjust the next record in the storage area to the predetermined position for the succeeding transport.

129. A multiple record phonograph having a playing platform provided with an upwardly extending center pin, a swinging arm carrying a reproducer and stylus and cooperative with records on the playing platform, and record transfer means for horizontally sliding a record over the center pin of the playing platform and depositing it on the playing platform, the stylus being at an elevation above the record to be deposited.

130. In a phonograph, the combination with a rotatable playing platform adapted to support a plurality of records about a center pin, and a reproducer and stylus cooperative with the upper record thereon for playing said record, of a magazine adapted to receive and support a repertoire of records stacked on top of one another in indeterminate relation, said magazine being in the form of a record receiver and having a bottom extending to side walls at the more remote part of the magazine to support the records, the side walls providing stops for the records and limiting their movement so that their center holes are in predetermined positions dependent upon the size of the particular record and its position in the stack, inclined guides extending upwardly from the record receiver to points higher than the playing platform, and automatic record changing mechanism automatically set into operation upon the completion of the playing of a record to carry out a cycle of operations whereby the records in said stack are transferred to the playing platform one at a time and played successively thereon, said mechanism including a reciprocatory arm carrying a pin movable over the positions of the center holes of different sized records and engageable with the center hole of the upper record in said record receiver to move said record from the record receiver along the guides to bring it above the playing platform where it is supported by the center pin of the playing platform and said guides until the center hole of the record is brought over the center pin on the playing platform to permit the record to drop onto the playing platform, said reciprocatory arm being thereupon returned toward the stack of records in the record receiver and brought against the uppermost record therein to move it from the indeterminate position to a predetermined position from which it may be removed during the next cycle of operations.

131. In the operation of multiple record phonographs wherein the records to be played are placed in a magazine in a stack in indeterminate lateral relation and wherein the records are mechanically shifted in succession to the playing position, the step which consists in always bringing the uppermost record of the stack to a determinate record-shifting position without changing its support.

132. In the operation of multiple record phonographs wherein records to be played are stacked on top of one another in a record magazine in indeterminate lateral relation and wherein the records are mechanically shifted in succession to the playing position, the step which consists in always bringing the upper record to a predetermined record-shifting position by sliding it across the face of the next lower record against fixed stops.

133. In the operation of multiple record phonographs wherein the records to be played are stacked on top of one another in a record magazine with the records, except the upper record, in indeterminate lateral relation, and wherein the records are transferred one at a time from the magazine to the playing platform, the step which consists in always successively bringing each record to be transferred to a predetermined record-transfer position in the magazine by sliding it across the face of the next lower record before the record already transferred is played.

134. In the operation of multiple record phonographs wherein a record to be played is taken from a record magazine and deposited on a playing platform having a center pin, the method which includes laterally moving the record beyond fixed supporting guides to cause it to be supported solely on top of the center pin while preventing undue tilting of said record, and then bringing the center hole of the record over the center pin so that the record may drop down onto the platform.

135. In the operation of multiple record phonographs wherein a record to be played is taken from a record magazine and deposited on a playing platform having a center pin, the method which includes laterally moving the record beyond fixed supporting guides to cause it to be supported solely on top of the center pin, and applying downward forces on the upper side of the record on opposite sides of the pin to prevent tilting of the record while supported on the center pin, and then bringing the center hole of the record over the center pin so that the record may drop down onto the platform.

136. In the operation of multiple record phonographs, the method of transferring records from a magazine to a platform where they are to be played, which consists in inserting a record shifting finger downwardly into the center hole of a record, moving the finger and record to cause the record to slide along stationary guides while supported thereby, moving the record onto the upper end of the center pin of the playing platform so that the record rests on both the guides and the pin while preventing undue tilting of said record, and further moving the record so that it rests solely on the end of the pin, and then moving the record to bring the center hole above the pin.

137. The combination with a talking machine having a rotatable record support, a continuously operating electric motor for driving the record support, a sound reproducing means including a stylus cooperative with sound grooves on the sound record and moved thereby across said support, and an auxiliary electric motor operated intermittently, of a normally open switch in the circuit of the auxiliary motor which closes automatically in response to a movement of the reproducing means toward the center of the record support at a speed greater than the normal speed of approach brought about by the sound grooves, and operating means for closing said switch, said means including a member controlled directly by the reproducing means and a second member operating at a predetermined speed relative to the speed of the record support and interconnected with the first member to close the switch, said reproducer controlled member being ineffective to open the starting switch.

138. The combination with a talking machine having a rotatable record support, a continuously operating electric motor for driving the record support, sound reproducing means including a stylus cooperative with sound grooves on the sound record and moved thereby across said support, and an auxiliary electric motor operated intermittently, of a normally open switch in the circuit of the auxiliary motor which closes automatically in response to a movement of the reproducing means toward the center of the record support at a speed greater than the normal speed of approach brought about by the sound grooves, operating means for closing said switch, said means including a member controlled directly by the reproducing means and a second member operating at a predetermined speed relative to the speed of the record support and interconnected with the first member to close the switch, and means operated by the auxiliary motor for thereafter resetting the starting switch to open position.

139. The combination with a talking machine having a rotatable record support, a continuously operating electric motor for driving the record support, sound reproducing means including a stylus cooperative with sound grooves on the sound record and moved thereby across said support, and an auxiliary electric motor operated intermittently, of a normally open switch in the circuit of the auxiliary motor which closes automatically in response to a movement of the reproducing means toward the center of the record support at a speed greater than the normal speed of approach brought about by the sound grooves, operating means for closing said switch, said means including a member controlled directly by the reproducing means and a second member operating at a predetermined speed relative to the speed of the record support and interconnected with the first member to close the switch, and a permanent stop against which the second member is carried in response to the continued rotation of the record support when the reproducing means fails to move at said greater speed, the stop acting to close the switch.

140. The combination with a talking machine having a rotatable record support, a continuously operating electric motor for driving the record support, sound reproducing means including a stylus cooperative with sound grooves on the sound record and moved thereby across said support, and an auxiliary electric motor operated intermittently, of a normally open switch in the circuit of the auxiliary motor comprising stationary contacts carried in a swinging arm, a movable contact carried on a lever pivoted on the arm, and a second lever also carried on the arm, the two levers being normally interlocked to hold the switch open, the switch closing automatically in response to a movement of the reproducing means toward the center of the record support at a speed greater than the normal speed of approach brought about by the sound groove, operating means for closing said switch, said means including a member controlled directly by the reproducing means and a second member operating at a predetermined speed relative to the speed of the record support and interconnected with the first member to close the switch, and means operated by the auxiliary motor for thereafter resetting the starting switch to open position.

141. In a phonograph the combination with a motor driven turntable, a record, and a movable arm carrying a reproducer and stylus, the record having a grooved playing surface and a groove which suddenly moves the arm inwardly after the completion of the playing of a record, of an auxiliary motor, a normally open starting switch in the auxiliary motor circuit, and switch operating mechanism sensitive to such sudden inward movement of the arm whereby the mechanism to close the switch will function only after the completion of the playing of a record.

142. In a phonograph the combination with a motor driven turntable, a record, and a movable arm carrying a reproducer and stylus, the record having a grooved playing surface and a groove which suddenly moves the arm inwardly after the completion of the playing of a record, of an auxiliary motor, a normally open starting switch in the auxiliary motor circuit, and switch operating mechanism sensitive to such sudden inward movement of the arm whereby the mechanism will function to close the switch only after the completion of the playing of a record, and auxiliary motor operated means to reset the switch to open position.

143. In a phonograph, a disk record having a playing surface and a control groove inside the playing surface to receive the stylus after completion of the playing of the record, a portion of said control groove being of greater pitch than the grooves of the playing surface, a motor driven turntable for supporting the record, a control switch having fixed contacts, and a movable contact biased toward closed position and latched in open position, and means to trip the latch and close the switch when the stylus is traversing the said portion of greater pitch.

144. In a phonograph, a disk record having a playing surface and a control groove inside the playing surface to receive the stylus after completion of the playing of the record, a portion of said control groove being of greater pitch than the grooves of the playing surface, a motor driven turntable for supporting the record, a control switch having fixed contacts, and a movable contact biased toward closed position and latched in open position, means to trip the latch and close the switch when the stylus is traversing the said portion of greater pitch, and a device operated after the circuit is closed for resetting the latch to hold the switch open.

145. The combination with a talking machine having a rotatable record support, a continuously operating electric motor for driving the record support, sound reproducing means including a stylus cooperative with sound grooves on the sound record and moved thereby across said support, and an auxiliary electric motor operated intermittently, of a normally open switch in the circuit of the auxiliary motor comprising stationary contacts carried in a swinging arm, a movable contact carried on a lever pivoted on the arm, and a second lever also carried on the arm, the two levers being normally interlocked to hold the switch open, the switch closing automatically in response to a movement of the reproducing means toward the center of the record support at a speed greater than the normal speed of approach brought about by the sound grooves, operating means for closing said switch, said means including a member controlled directly by the reproducing means and a second member operating at a predetermined speed relative to the speed of the record support and interconnected with the first member to close the switch, and means operated by the auxiliary motor for thereafter resetting the switch to open position, said resetting means comprising a motor operated oscillatory member which engages, when moving in one direction only, with a member carried by the swinging arm to swing the arm and parts carried thereby to bring one of the levers against a fixed stop.

146. In a phonograph controller, the combination with an automatic trip switch effective on the completion of the playing of a record to close a circuit for an auxiliary motor, an auxiliary-motor-operated one revolution shaft, an oscillatory member operated thereby, and means carried by the oscillatory member and engageable with the trip switch during movement of the oscillatory member in one direction only to reset the trip switch to open position.

147. In a phonograph, a swinging arm carrying a pair of spring controlled toggle forming levers and a switch open when the levers are locked by the toggle, a fixed stop, and means to bring one of the levers against the fixed stop to reset the toggle to open the switch, said means comprising a motor operated device out of the range of movement of the arm when the phonograph is playing a record.

148. In a multiple record phonograph, a record magazine for a repertoire of records to be played from a stack in succession, said magazine being in the form of an upwardly opening receptacle to receive the stack of records, and having a sloping bottom and side walls at one side of the sloping bottom to limit the movement of the records across the sloping bottom, the angle of slope being insufficient to permit the records in the stack to freely slide relative to one another under the influence of gravity.

149. A multiple record phonograph having a movable reproducer support, a rotatable playing platform for supporting records to be played by the reproducer, a record magazine placed to one side of the playing platform and adapted to receive a stack of records, a reciprocatory record shifting arm for shifting a record from the magazine to the playing platform, the record shifting arm being also mounted for vertical movement, guides over which the record slides in being shifted to the playing platform, and stationary cam means acting on the record shifting arm to support it when above the playing platform and prevent its engagement with a record on the platform.

150. In a record shifting mechanism for multiple record phonographs, a reciprocatory record shifter mounted for movement back and forth in horizontal directions and having an arm mounted for vertical movement under the influence of gravity, and means whereby the record shifting arm is caused to traverse one path when shifting a record and a different path when returning without a record.

151. In a record shifting mechanism for multiple record phonographs, a reciprocatory record shifter mounted for bodily movement back and forth in horizontal directions and having an arm mounted for limited vertical movement under the influence of gravity, the free end of the record shifting arm having a record shifting pin engageable with the center hole of a record when moving in one direction, and a record pusher, engageable with the surface of a record when moving in the opposite direction, the pin being held in the hole and the pusher against the record by gravity.

152. In a record shifting mechanism for multiple record phonographs, a reciprocatory record shifter mounted for bodily movement back and forth in horizontal directions and having an arm mounted for limited vertical movement under the influence of gravity, the free end of the record shifting arm having a record shifting pin engageable with the center hole of a record when moving in one direction, and a record pusher, engageable with the surface of a record when moving in the opposite direction, the pin being held in the hole and the pusher against the record by gravity, and a cam to limit the downward movement of the arm at certain portions of its travel.

153. A multiple record phonograph having a playing platform, a record magazine to one side of the playing platform, a reciprocatory record shifting member having its free end vertically movable so as to rest on the record being shifted, and cooperative stationary members for effecting a transfer of a record from the magazine to the platform, said members terminating adjacent the playing platform and at a higher elevation than the playing platform and being so interrelated that the record is underneath the shifting member and resting under the influence of gravity on the stationary members throughout the transfer, and until it drops free of said supporting members onto the playing platform.

154. In a phonograph, a magazine having means for supporting a plurality of records of different predetermined diameters with an end record normally disposed in a position ready for transverse movement relative to the axes of the other records therein, a laterally offset record rotating table rotatable on a vertical axis and having upstanding record centering means thereon, supporting means for said table disposing said axis in vertical playing position throughout the operation of the phonograph, means for rotating said table throughout the operation of the phonograph, means for automatically feeding successive end records of different diameter transversely from their position in said magazine and into centered position on said table while the latter rotates in playing position, and mechanism for successively automatically reproducing said records on said table.

155. In a phonograph, a magazine having means extraneous of the record apertures for simultaneously supporting a plurality of records of the same or different diameter while enabling successive records to be fed transversely therefrom, a laterally offset record rotating table rotatable on a vertical axis and having upstanding axial record centering means thereon, supporting means for said table disposing said axis in vertical playing position throughout the operation of the phonograph, means for rotating said table about said axis throughout said operation, means for automatically feeding successive records of the same or different diameter transversely from their position in said magazine and relative to the axes of other records therein and into centered position on said table while the latter rotates in playing position, and mechanism for successively automatically reproducing said records on said table irrespective of their variations in diameter.

JACK POTTER STOCKTON.